(12) United States Patent
Lee et al.

(10) Patent No.: US 9,055,326 B2
(45) Date of Patent: Jun. 9, 2015

(54) CONTENT CONTROL METHOD AND CONTENT PLAYER USING THE SAME

(75) Inventors: Miyoung Lee, Seoul (KR); Jooyoung Lim, Seoul (KR); Kirack Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 13/643,836

(22) PCT Filed: May 27, 2011

(86) PCT No.: PCT/KR2011/003926
§ 371 (c)(1),
(2), (4) Date: Oct. 26, 2012

(87) PCT Pub. No.: WO2011/149315
PCT Pub. Date: Dec. 1, 2011

(65) Prior Publication Data
US 2013/0055129 A1    Feb. 28, 2013

(30) Foreign Application Priority Data

May 28, 2010  (KR) .................. 10-2010-0050581
Jun. 3, 2010   (KR) .................. 10-2010-0052224

(51) Int. Cl.
*G06F 3/048*    (2013.01)
*H04N 21/431*   (2011.01)
*H04N 21/472*   (2011.01)
*H04N 21/482*   (2011.01)
*G06F 3/0484*   (2013.01)

(52) U.S. Cl.
CPC .......... *H04N 21/4312* (2013.01); *G06F 3/0484* (2013.01); *H04N 21/472* (2013.01); *H04N 21/482* (2013.01)

(58) Field of Classification Search
CPC ...................................................... G06F 3/0484
USPC .................................................. 715/769, 704
See application file for complete search history.

(56) References Cited

U.S. PATENT DOCUMENTS

| 7,318,203 | B2 * | 1/2008  | Purves et al.    | 715/853 |
| 7,607,102 | B2 * | 10/2009 | Ording et al.    | 715/769 |
| 7,787,751 | B2 * | 8/2010  | Hatanaka et al.  | 386/252 |
| 7,899,915 | B2 * | 3/2011  | Reisman          | 709/228 |
| 8,302,021 | B2 * | 10/2012 | Dettinger et al. | 715/769 |
| 8,627,211 | B2 * | 1/2014  | Kropivny         | 715/754 |
| 2001/0024212 | A1 | 9/2001 | Ohnishi |  |
| 2003/0184587 | A1 | 10/2003 | Ording et al. |  |

(Continued)

FOREIGN PATENT DOCUMENTS

| JP | 6-19669 A     | 1/1994  |
| JP | 2001-273066 A | 10/2001 |

(Continued)

*Primary Examiner* — William Titcomb
(74) *Attorney, Agent, or Firm* — Birch, Stewart, Kolasch & Birch, LLP

(57) ABSTRACT

The present invention relates to a content control method and a content player using the same, wherein the content control method comprises the steps of: displaying a plurality of functions which can be executed on the contents, along with content images corresponding to a plurality of contents respectively; dragging one image corresponding to a first content out of the displayed content images and receiving a drop movement in a first region; and executing at least one of the functions corresponding to the first region upon the first content.

19 Claims, 38 Drawing Sheets

(56) References Cited

U.S. PATENT DOCUMENTS

| | | | |
|---|---|---|---|
| 2006/0129945 A1* | 6/2006 | Dettinger et al. | 715/769 |
| 2007/0016872 A1* | 1/2007 | Cummins et al. | 715/769 |
| 2007/0234227 A1* | 10/2007 | Prinsen et al. | 715/769 |
| 2008/0155439 A1* | 6/2008 | Stern et al. | 715/769 |
| 2008/0294986 A1* | 11/2008 | Seo et al. | 715/704 |
| 2009/0193351 A1 | 7/2009 | Lee et al. | |
| 2009/0259959 A1* | 10/2009 | Grotjohn et al. | 715/769 |
| 2009/0288028 A1 | 11/2009 | Gohda et al. | |
| 2009/0313567 A1* | 12/2009 | Kwon et al. | 715/769 |

FOREIGN PATENT DOCUMENTS

| | | |
|---|---|---|
| JP | 2003-87136 A | 3/2003 |
| JP | 2009-277193 A | 11/2009 |
| KR | 10-2009-0083126 A | 8/2009 |

* cited by examiner

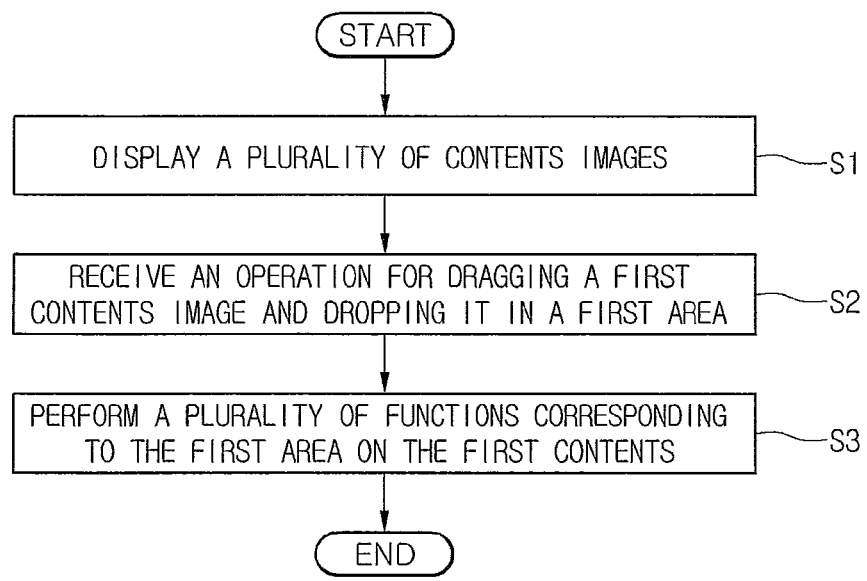
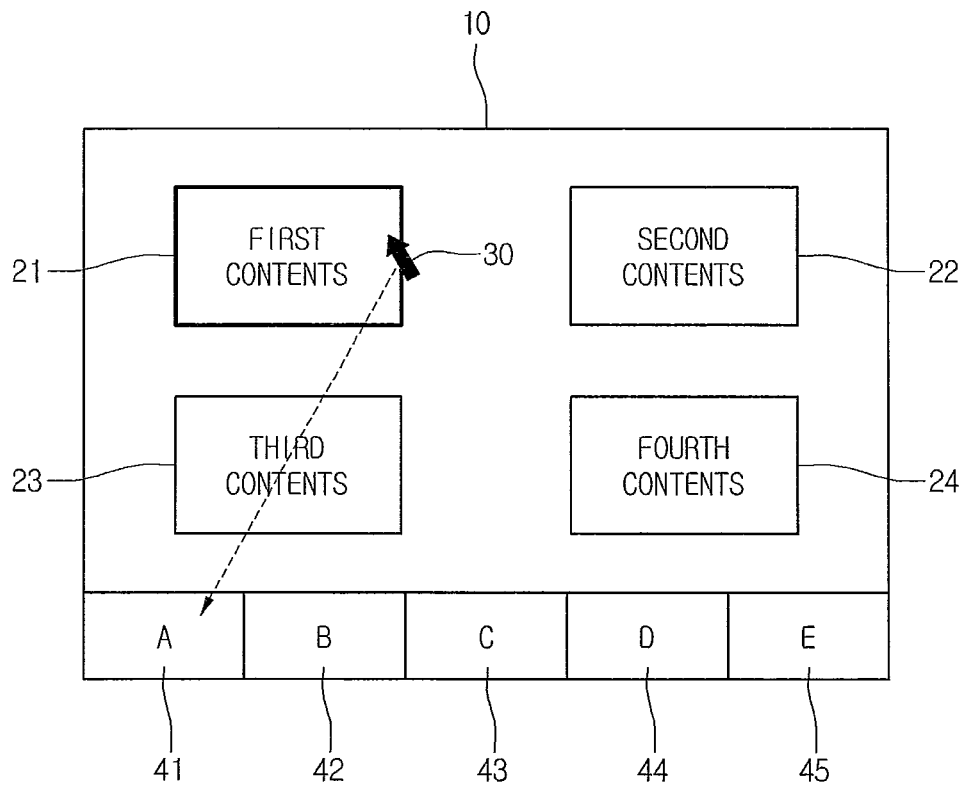

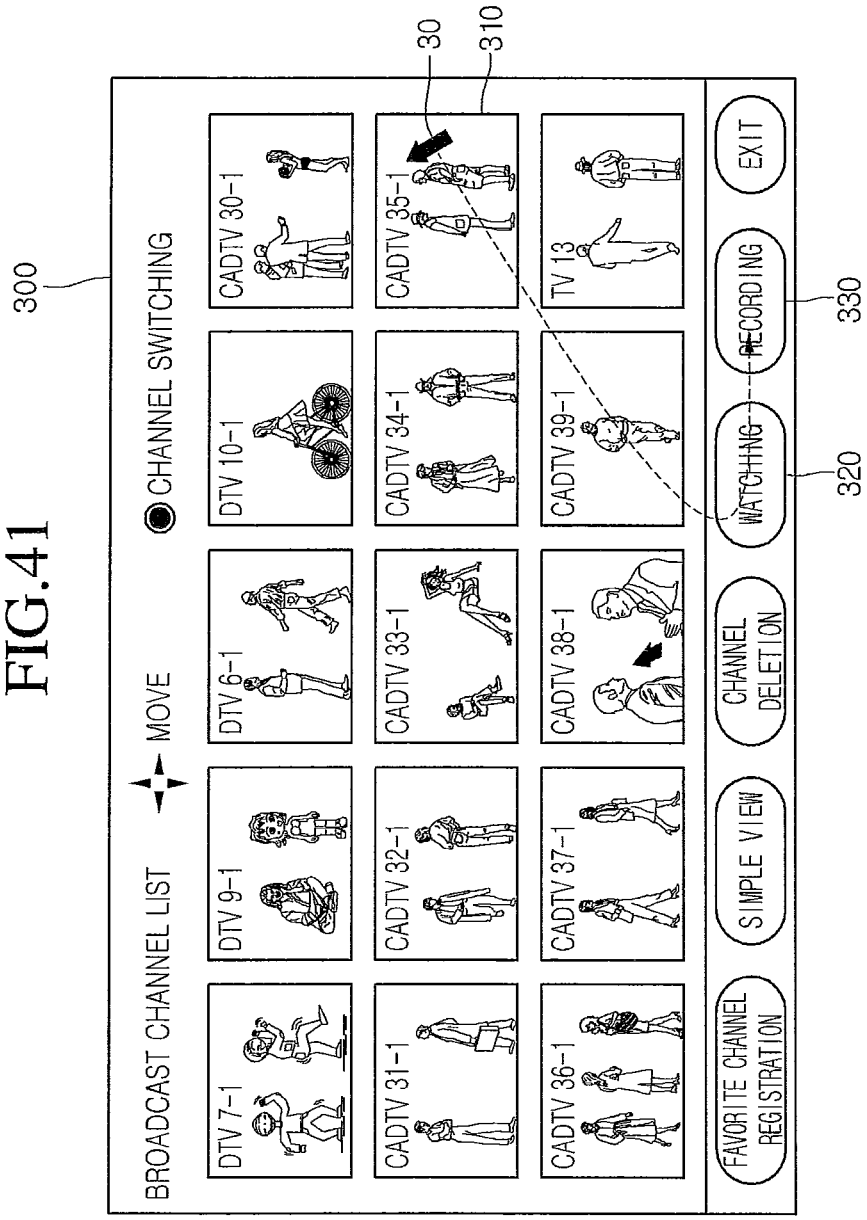

CONTENT CONTROL METHOD AND CONTENT PLAYER USING THE SAME

TECHNICAL FIELD

The present disclosure relates to a method of controlling a plurality of contents played in a display device.

BACKGROUND ART

As a digital TV having more excellent signal processing and storage ability than an existing analog TV and a wired/wireless network are developed and commercialized, various kinds of contents services such as real-time broadcasts, Contents on Demands (CODs), games, news, and video communications are provided to a user via an internet network connected to each home in addition to existing electronic wave media.

As an example of a contents service provider using the internet network, an Internet Protocol TV (IPTV) may be provided. The IPTV transmits and provides various kinds of information services, video contents, and broadcasts to a user's TV via a high-speed internet network.

Recently, the concept such as a broadband TV and a web TV is suggested as a network TV form further developed from such an IPTV. Unlike the typical IPTV, there are a plurality of contents providers for the broadband TV or web TV, and a user individually accesses the plurality of contents providers in order to receive contents such as various VODs and games that a contents provider provides.

DISCLOSURE OF THE INVENTION

Technical Problem

Embodiments provide a method of efficiently controlling a plurality of contents in a contents playing device.

Technical Solution

In one embodiment, a method of controlling contents includes: displaying contents images that respectively correspond to a plurality of contents and a plurality of functions that are available for the contents; receiving an operation for dragging an image corresponding to first contents among the displayed contents images and dropping the dragged image in a first area; and performing at least one function corresponding to the first area on the first contents.

In another embodiment, a method of controlling contents includes: displaying a plurality of contents images respectively corresponding to a plurality of contents; receiving an operation for dragging an image of a first area and dropping the dragged image in an area where an image corresponding to first contents among the displayed contents images is displayed; and performing at least one function corresponding to the first area on the first contents.

In further another embodiment, a contents playing device includes: a display unit for displaying contents images that respectively correspond to a plurality of contents and a plurality of functions available for the contents; an interface unit for receiving an operation for dragging an image corresponding to first contents among the displayed contents images and dropping the dragged image in a first area; and a control unit for performing at least one function corresponding to the first area on the first contents.

In still further another embodiment, a computer readable recording medium for recording a program for executing the above method on a computer.

Advantageous Effects

According to an embodiment of the present invention, by performing a specific operation on corresponding contents through a drag and drop operation on a contents image displayed on a screen, a User Interface (UI) for allowing contents to be easily controlled may be provided.

According to another embodiment of the present invention, by performing a function, which corresponds to a dropped position through a drag and drop operation for a contents image displayed on a screen, and also a function on a drag path, a plurality of functions on specific contents may be easily performed.

BRIEF DESCRIPTION OF THE DRAWINGS

FIG. 1 is a flowchart illustrating a method of controlling contents according to an embodiment of the present invention.

FIGS. 2 to 3 are views illustrating a method of performing a specific function on contents according to a first embodiment of the present invention.

FIG. 41 is a view illustrating a method of controlling a plurality of channels in a channel browser according to another embodiment of the present invention.

MODE FOR CARRYING OUT THE INVENTION

Figure 3:
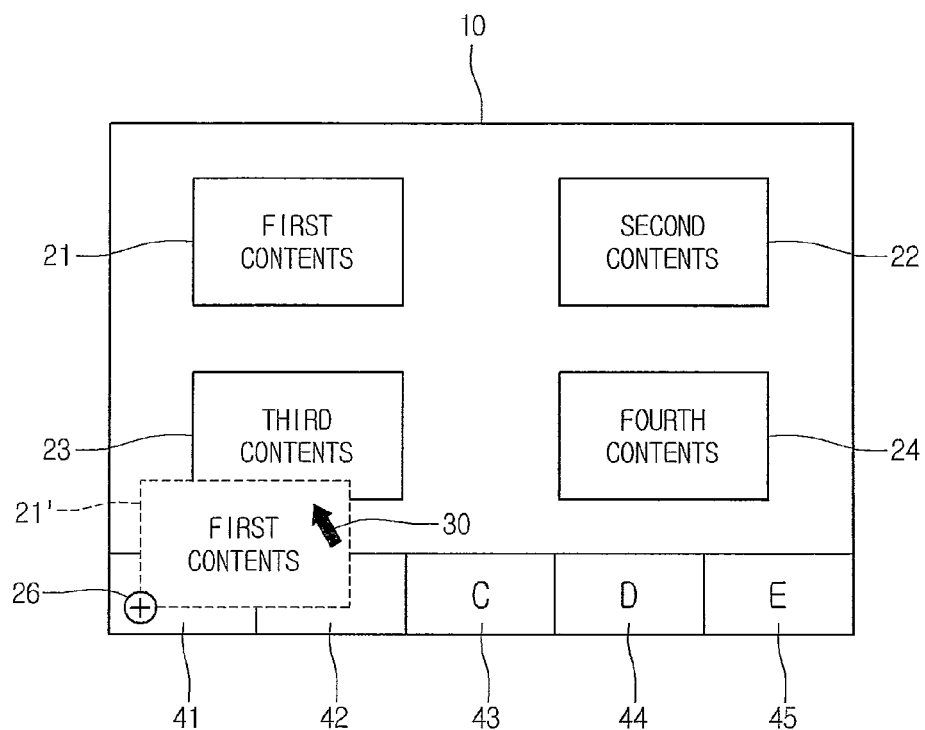

Hereinafter, a method of controlling contents and a display device using the same according to an embodiment of the present invention will be described in more detail with reference to the accompanying drawings.

FIG. 1 is a flowchart illustrating a method of controlling contents according to an embodiment of the present invention.

The method of controlling contents may be performed by a contents playing device for playing contents in response to a signal inputted from an external or stored therein.

For example, the contents may include images and sounds, and accordingly, the method of controlling contents may be performed by a display device including a display unit for displaying images and a sound output unit for outputting sounds.

However, the method of controlling contents is not limited to being performed by the display device, and may be performed by various devices that plays contents such as mobile phones, smart phones, notebook computers, digital broadcasting terminals, Personal Digital Assistants (PDAs), Portable Multimedia Players (PMPs), and navigation devices.

Referring to FIG. 1, a contents playing device displays a plurality of images respectively corresponding to a plurality of playable contents in operation S1.

The plurality of contents may include various contents such as real-time broadcast channels, Contents on Demands (CODs), games, news, and video phones, and for this, a contents playing device may receive signals corresponding to the plurality of contents via a wired/wireless network, for example, internet.

Moreover, there may be a plurality of contents providers respectively corresponding to the plurality of contents. In this case, a contents playing device, for example, a display device, may separately access the plurality of contents providers in response to a user's request, and may receive various contents such as real-time broadcasts, CODs, games, videos, pictures, weather information, news, video phone services that the contents providers provide.

Additionally, the contents playing device may display information on each of the plurality of contents on a screen in operation S1, and for example, the contents information may include letters in addition to the above contents images.

For example, the displayed contents information may be a letter including information related to the contents such as the title, ID number, contents provider, and contents of corresponding contents, or an image that represents corresponding contents, and may include data for allowing a user to identify the plurality of contents and briefly recognize each contents.

Referring to FIG. 2, a plurality of playable contents, that is, information on each of first to fourth contents 21, 22, 23, and 24, may be displayed on a screen 10. For example, the contents information 21, 22, 23, and 24 may be a thumbnail image, that is, a reduced image of a specific portion in an image of corresponding contents.

Moreover, a plurality of areas 41, 42, 43, 44, and 45 corresponding to a plurality of functions may be displayed on the screen 10. For example, an "A" function area 41, a "B" function area 42, a "C" function area 43, a "D" function area 44, an "E" function area 45, which are available for contents, may be provided at the bottom of the screen 10.

Information on a corresponding function, for example, the name or brief description of a corresponding function or its image, may be displayed in each of the function areas 41, 42, 43, 44, and 45

In more detail, the plurality of functions may include various functions that may be performed on contents such as "watching", "recording", "favorite channel registration", "easy view", "download", "transmission", "upload", and "channel edit", and a user may edit, for example, add or delete, contents.

Then, the contents playing device receives an operation for dragging a first contents image among the plurality of displayed contents images, and dropping it in the first area in operation S2.

The drag and drop is a user's gesture using a specific input means in a Graphic User Interface (GUI) environment, and also, is a user interface method including one operation for selecting a specific object by using the input means in order to move it to a specific position.

For example, the drag refers to moving the input means while a specific button equipped in an input means is pressed in order to move the object to a specific position, and the drop refers to dropping the object in a specific position by releasing the button pressed during the drag.

More specifically, the drag and drop operation may be performed by selecting an object in one area of a screen with the input means, and then, dragging and dropping it in another position of the screen, and in this case, an operation corresponding to the position of the object may be performed.

The drag and drop operation uses an intuitive graphic interface, and a desired operation on a specific object may be performed by the signal drag and drop operation, so that it is a useful method that a user may easily adapt.

According to an embodiment of the present invention, a user may perform the drag and drop operation on specific contents and a specific area in a contents image displayed on a screen by using an equipped input means.

Moreover, the input means for performing the drag and drop operation may be a remote control device connected to a contents playing device via wired/wireless communication method, or a device for detecting the motion of a user's body part such as the fingers or eyes.

For example, the remote control device may be an input means such as a space remote controller or mouse, which recognizes a user's motion and transmits a signal corresponding thereto to the contents playing device.

Additionally, the contents playing device may include a touch panel for detecting the contact position of a specific object and the movement of the object in contact, and accordingly, a user may contact a screen by using a user's finger or a specific object and may perform the drag and drop operation.

Furthermore, the contents playing device may include a sensing unit for sensing the movement of a user's eye, and accordingly, may receive the drag and drop operation according to the movement of the user's eye.

Referring to FIG. 2, a pointer 30, which moves in correspondence to the movement of the input means, may be displayed on the screen 10 having the plurality of contents images 21, 22, 23, and 24 displayed, and accordingly, the pointer 30 may display the position that a user wants to point by using the input means.

A user may select the first contents image 21 among the plurality of contents by using the input means, and may drag it in a specific direction, for example, a direction where the "A" function area 41 is disposed (indicated with an arrow) in order to move it.

Through the above drag operation, the first contents image 21 may be moved in the direction to the "A" function area 41, in addition to the movement of the pointer 30.

As shown in FIG. 3, when a user selects the first contents image 21 and drag it by using the input means, a virtual image 21' corresponding to the first contents image 21 may be generated, and then, according to the movement of the pointer 30 by moving the input means, the virtual image 21' of the first contents may be moved to the "A" function area 41.

Hereinafter, dragging a specific contents image may include dragging a contents image itself displayed on the screen 10 and dragging a virtual image corresponding to the contents image.

That is, when the contents image 21 is dragged by a user, the first contents image 21 displayed on the screen 10 may be moved in a specific direction, or the virtual image 21' of the first contents image may be moved.

After the first contents image 21 is dragged and moved to the "A" function area 41, a user may drop and position the first contents image 21 in the "A" function area 41.

Moreover, dropping a contents image in a specific area may refer to moving and putting a predetermined point of a displayed contents image in the specific area.

That is, as shown in FIG. 3, when a specific point in the virtual image 21' of the first contents, for example, a left corner point 21, is put in the "A" function area 41, the first contents image 21 may be configured to be dropped in the "A" function area 41.

Through the above connected single operation, a drag and drop operation on the first the first contents image 21 and the "A" function area 41 may be performed.

Moreover, in response to the inputted drag and drop operation, the contents playing device performs a plurality of functions corresponding to the dropped first area on the dragged first contents in operation S3.

Referring to FIG. 3, as mentioned above, when a user drags the first contents image 21 and drops it in the "A" function area 41, an "A" function corresponding to the dropped area 41 may be performed on the first contents corresponding to the dragged image 21.

According to an embodiment of the present invention, at least two functions may be configured to correspond to at least one area among a plurality of function areas displayed on the screen 10.

Figure 4:
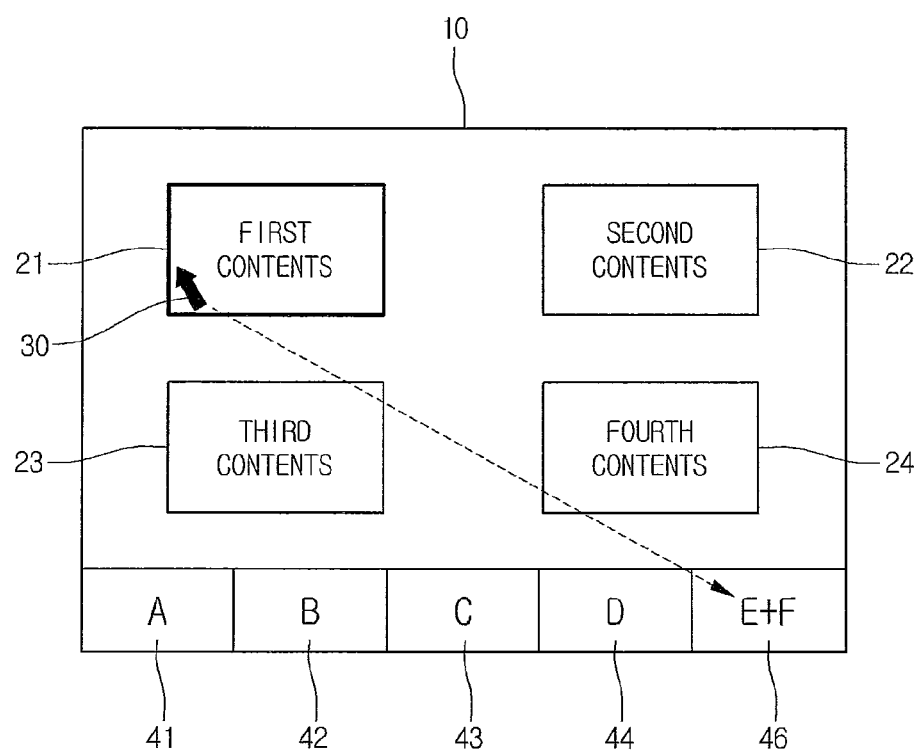
FIGS. 4 to 5 are views illustrating a method of performing a specific function on contents according to a second embodiment of the present invention.

Referring to FIG. 4, at least two functions, for example, the "E" function and "F" function, may correspond to one area 46 among a plurality of function areas 41, 42, 43, 44, and 46, and accordingly, information on the "E" function and "F" function may be additionally displayed in the multiple function area 46.

Figure 5:
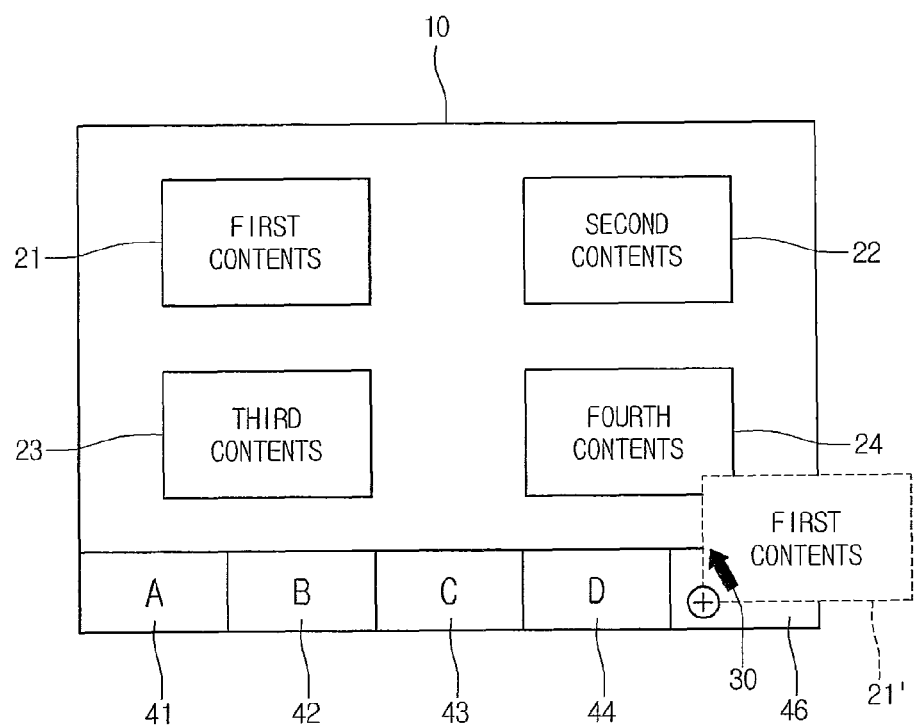

Referring to FIG. 5, a user may drag the first contents image 21 and may move and drop it in the "E" and "F" function area 46, and accordingly, the "E" function and "F" function may be performed on the first contents.

According to the above drag and drop operation, the "E" function and the "F" function may be simultaneously performed on the first contents, or may be sequentially performed according to a specific order with a time difference. Moreover, when the plurality of functions are performed sequentially, a user may designate and edit the order in which the plurality of functions are performed.

Hereinafter, embodiments for a method of controlling contents will be described in more detail with reference to FIGS. 6 to 19.

Figure 6:
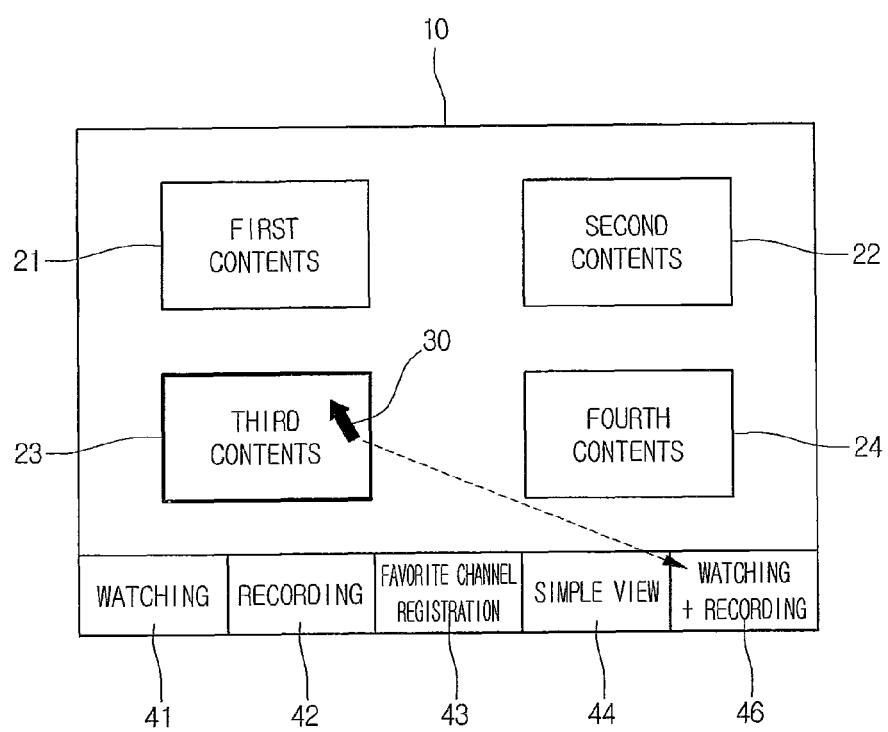
FIGS. 6 to 7 are views illustrating a method of performing a specific function on contents according to a third embodiment of the present invention.

FIG. 6 is a view illustrating a method of performing a plurality of functions on specific contents through a drag and drop operation. The same contents described with reference to FIGS. 1 to 5 will not be described below.

Referring to FIG. 6, a plurality of areas corresponding to each of a plurality of functions that may be performed on contents, that is, a "watching" function area 41, a "recording" function area 42, a "favorite channel registration" function area 43, and a "easy" function area 44, may be displayed at the bottom of the screen 10. Addition to that, there may be the multiple function area 46 corresponding to at least two functions. Additionally, a "watching" function and a "recording" function may be designated and correspond to the multiple function area 46.

According to an embodiment of the present invention, the number of the above function areas 41 to 46 and functions corresponding thereto may be changed by a user, and the number of multiple function areas 46 and at least two functions corresponding thereto may be also edited by a user.

As shown in FIG. 6, a user may drag the third contents image 23 and may drop it in a "watching+recording" function area 46, that is, a multiple function area, and accordingly, the "watching+recording" function may be performed on the third contents.

For example, through the above drag and drop operation, the third contents may be played on the screen 10 and also may be recorded on a storage medium equipped in or connected to the contents playback device.

According to another embodiment of the present invention, a user drags an image of an area corresponding to a specific function, and drops it in an area having a specific image displayed among contents images displayed on the screen 10, and accordingly, the function corresponding to the dragged image may be performed on the contents corresponding to the dropped area.

Figure 7:
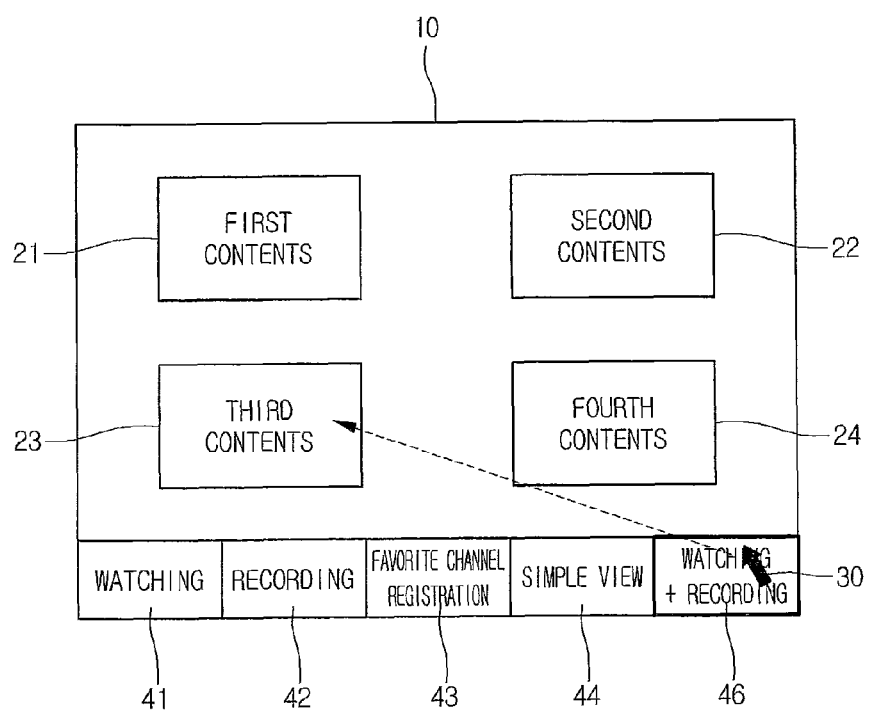

Referring to FIG. 7, a user may drag the image of the "watching+recording" function area 46, and may drop it in the area having the third contents image 23 displayed, and accordingly, the "watching" function and the "recording" function may be performed on the third contents.

FIGS. 8 to 12 are views illustrating a method of corresponding a plurality of functions to one area according to embodiments of the present invention.

According to an embodiment of the present invention, a user may edit at least two functions corresponding to the multiple function areas 46, and the number of functions corresponding to the multiple of function areas 46 may be at least 3.

Figure 8:
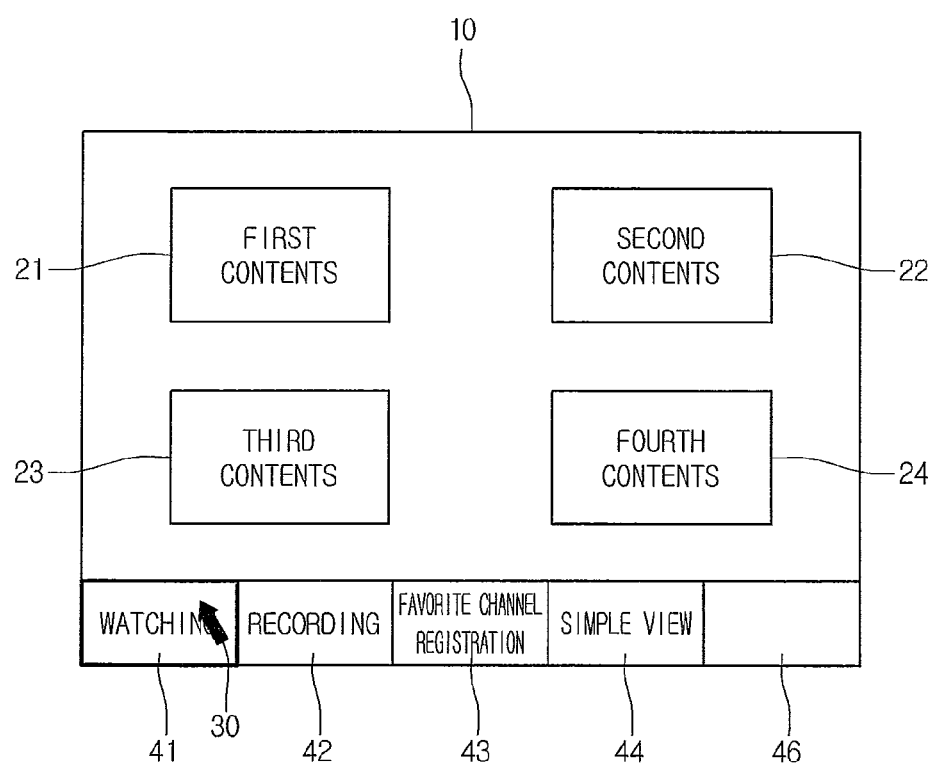
FIGS. 8 to 12 are views illustrating a method of corresponding a plurality of functions to one area according to embodiments of the present invention.

Referring to FIG. 8, a user may select one function, for example, a "watching" function, which may correspond to the multiple function areas 46, among a plurality of functions displayed on the screen 10, that is, "watching", "recording", "favorite channel registration", and "easy view".

Figure 9:
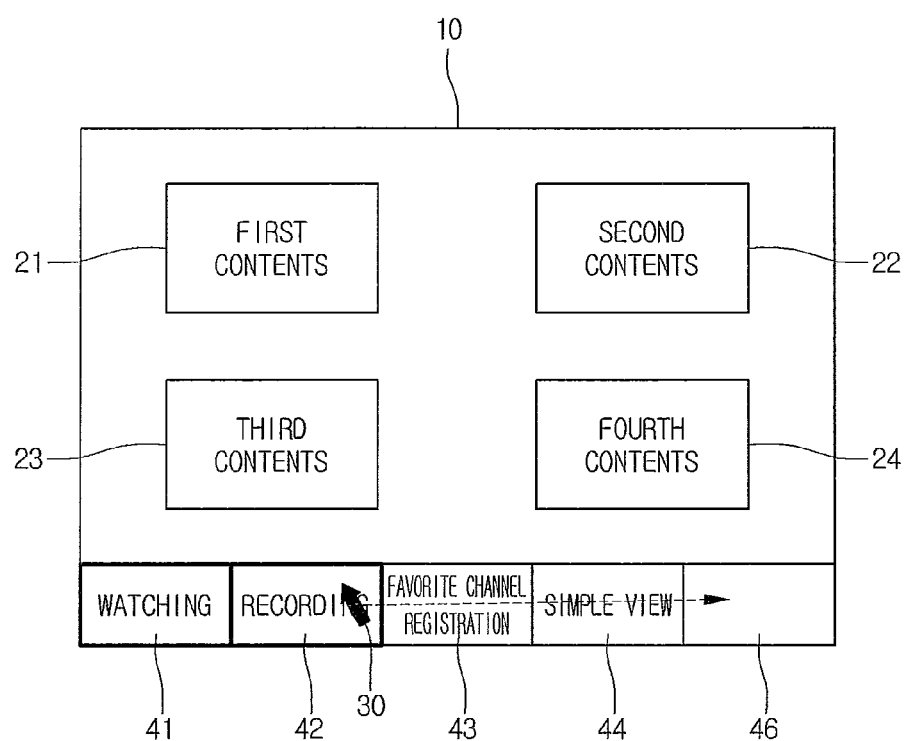

Then, as shown in FIG. 9, a user may select another function, for example, a "recording" function, which may correspond to the multiple function areas 46, among a plurality of functions displayed on the screen 10.

After selecting at least two functions corresponding to the multiple function area 46, the user may drag the images 41 and 42 corresponding to the selected functions, and then move them toward a specific area, for example, an empty function area 46.

Figure 10:
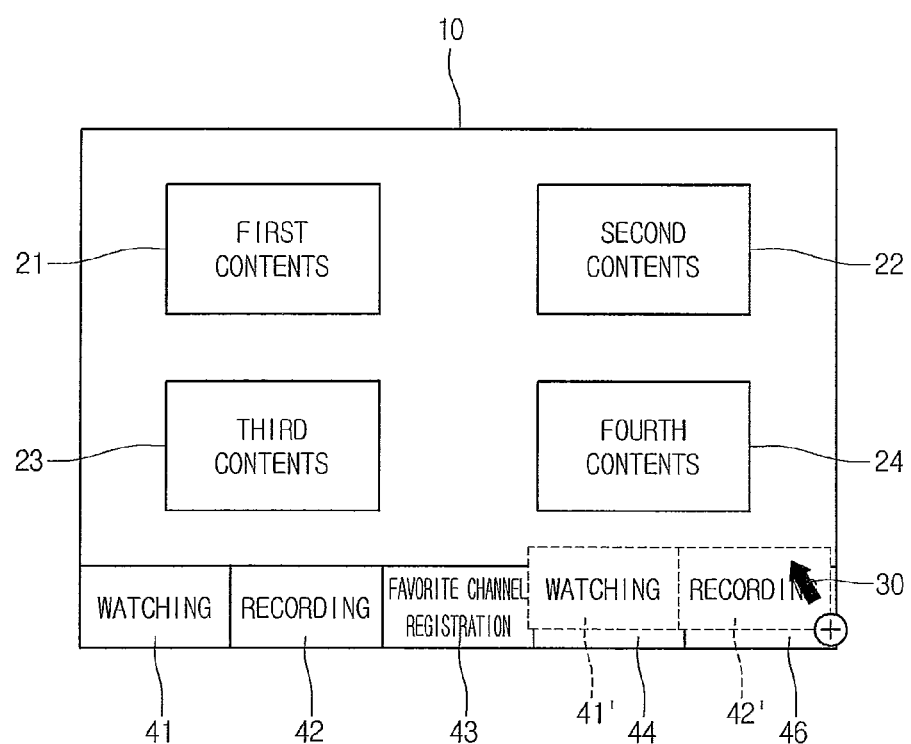

Referring to FIG. 10, the user may drop the dragged function images 41 and 42 in the empty function area 46, and for example, may drop the virtual image 41' of the "watching" function and the virtual image 42' of the "recording" function in the empty function area 46.

Accordingly, the "watching" function and "recording" function corresponding to the images dragged together may be configured to correspond to the dropped function area 46.

Figure 11:
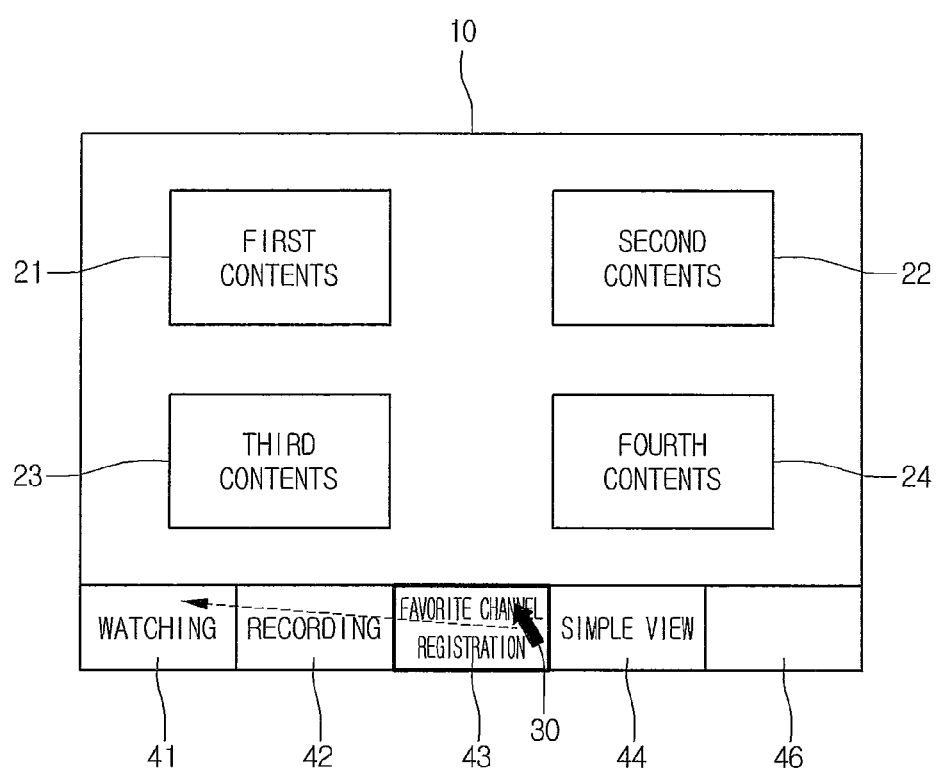
Figure 12:
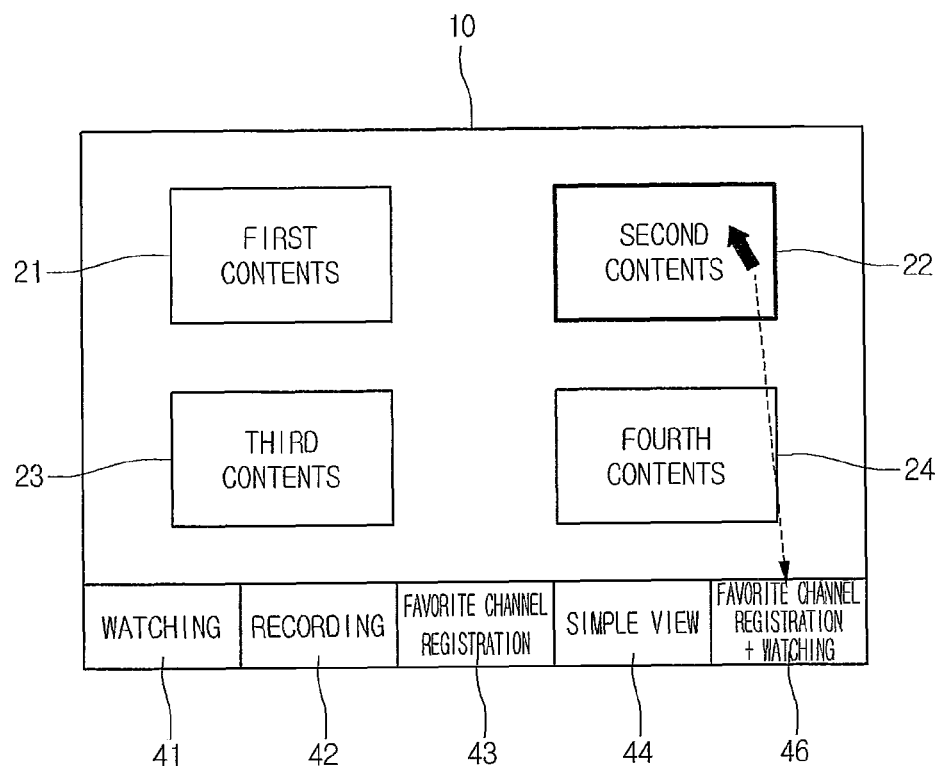

Referring to FIGS. 11 and 12, a user may drag an image corresponding to the "favorite channel registration" function among the functions displayed on the screen 10, and may drop the image in the area 41 corresponding to the "watching" function, and accordingly, both the "favorite channel registration" function and the "watching" function may be configured to correspond to the multiple function area 46.

Figure 13:
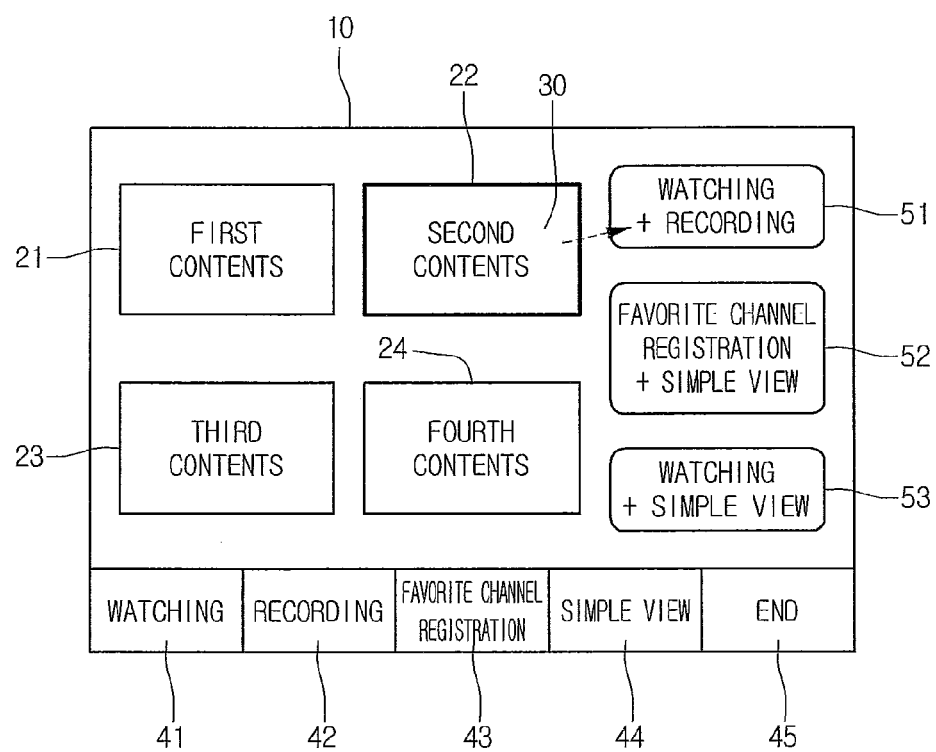
FIG. 13 is a view illustrating a method of performing a specific function on contents according to a fourth embodiment of the present invention.

FIG. 13 is a view illustrating a method of performing a plurality of functions on contents through a drag and drop operation according to an embodiment of the present invention.

Referring to FIG. 13, at least one of multiple function areas 51, 52, and 53 corresponding to at least two functions may be displayed on the screen 10.

For example, the first multiple function area 51 corresponding to a "watching" function and a "recording" function, a second multiple function area 52 corresponding to a "favorite channel registration" function and a "easy view" function, and a third multiple function area 53 corresponding to a "watching" function and an "easy view" function may be displayed at the right side of the screen 10.

In the case, a user may drag the second contents image 22, and may drop it in one of the multiple function areas 51, 52, and 53 displayed at the right side of the screen 10, for example, a "watching+recording" function area 51, and accordingly, the "watching" function and the "recording" function may be performed on the second contents.

Figure 14:
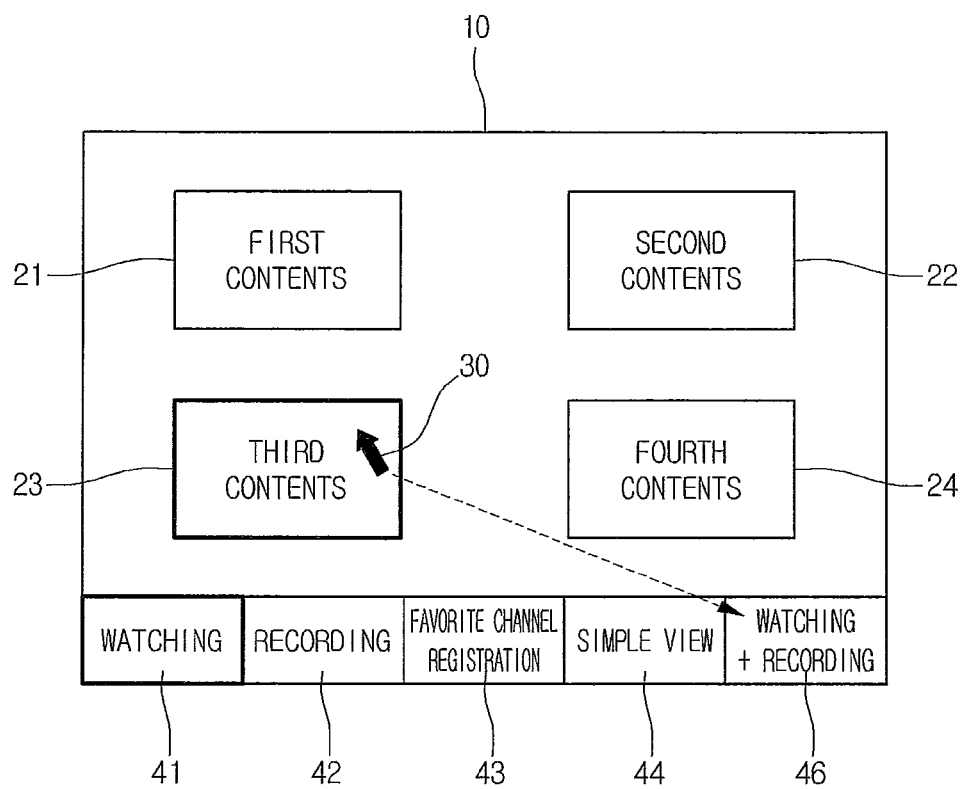
FIG. 14 is a view illustrating a method of performing a specific function on contents according to a fifth embodiment of the present invention.

FIG. 14 is a view illustrating a method of performing a specific function on a plurality of contents through a drag and drop operation according to an embodiment of the present invention.

Referring to FIG. 14, a user may select at least two of a plurality of contents images 21, 22, 23, and 24 displayed on a screen 10, and may perform the drag and drop operation on the selected images, so that a specific function on at least two contents corresponding to the selected images, for example, at least two function, may be performed.

For example, a user may select a first contents image 21 and a third contents image 23, and then may drag and drop the two images 21 and 23 together in a "watching+recording" function area 46, and accordingly, the "watching" function and the "recording" function may be performed on the first and third contents.

A contents playing device according to an embodiment of the present invention, for example, a display device, may display information on function previously-performed on contents.

FIGS. 15 to 18 are views illustrating a method of displaying information on previously-performed functions according to embodiments of the present invention.

Figure 15:
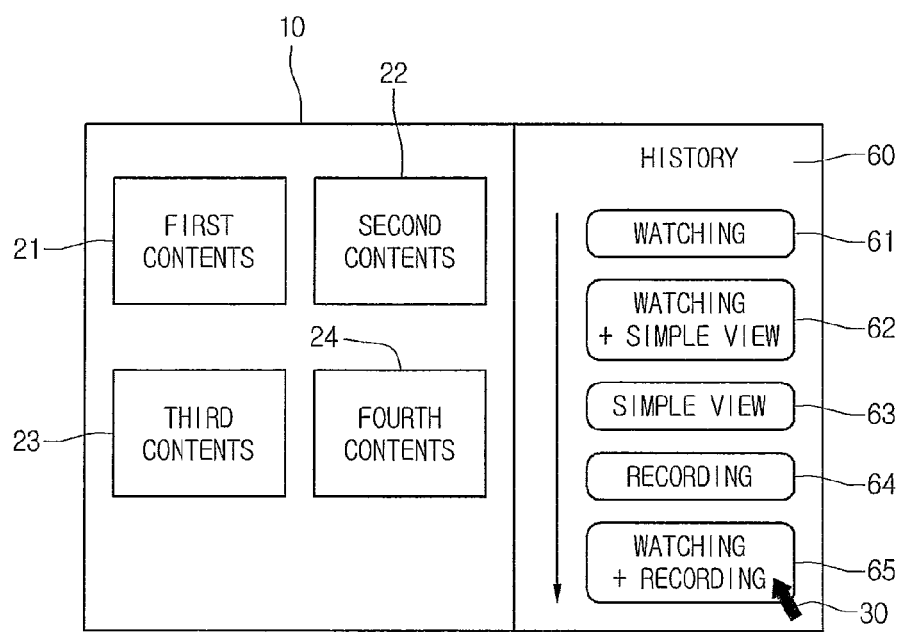
FIGS. 15 to 18 are views illustrating a method of displaying information on previously-performed functions according to embodiments of the present invention.

Referring to FIG. 15, information on functions that a user previously performs on contents, that is, performed function history information, may be displayed on a screen 10 on the basis of the current time.

For example, information corresponding to each of functions that a user previously performs, for example, "watching", "watching+easy view", "easy view", "recording", and "watching+recording" functions, may be displayed in a history area 60 at the right side of the screen 10. For example, the information may be images 51, 52, 53, 54, and 55 corresponding to each of the plurality of functions.

Moreover, along the direction of an arrow displayed on the history area 60, the most recently performed function, for example, a "watching+recording" function may be displayed at the bottom, and the oldest performed function, for example, a "watching" function may be displayed at the top. Both functions may be continuously displayed at the top and bottom, respectively.

Additionally, when a user selects one of the plurality of functions displayed on the history area 60, performance history information on the selected function may be displayed on the screen 10.

For example, as shown in FIG. 15, when a user positions a pointer 30 on a "watching+recording" function image 65 in the history area 60 for a predetermined time, performance history information on the "watching+recording" function such as a performed date, time, or number may be displayed on the screen 10.

Figure 16:
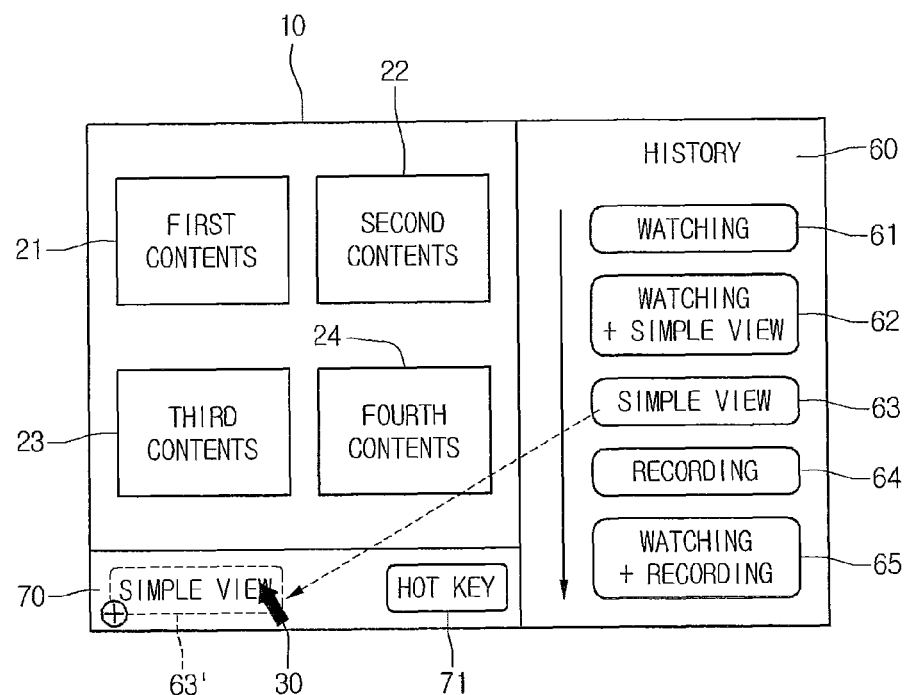

Referring to FIG. 16, a hot-key generation area 70 may be provided on the screen 10 in order to generate the multiple function area corresponding to at least two functions.

In this case, a user may select a hot-key button 71 after positioning at least two functions among functions available for contents, and accordingly, at least one area corresponding to the at least two functions may be generated.

Figure 17:
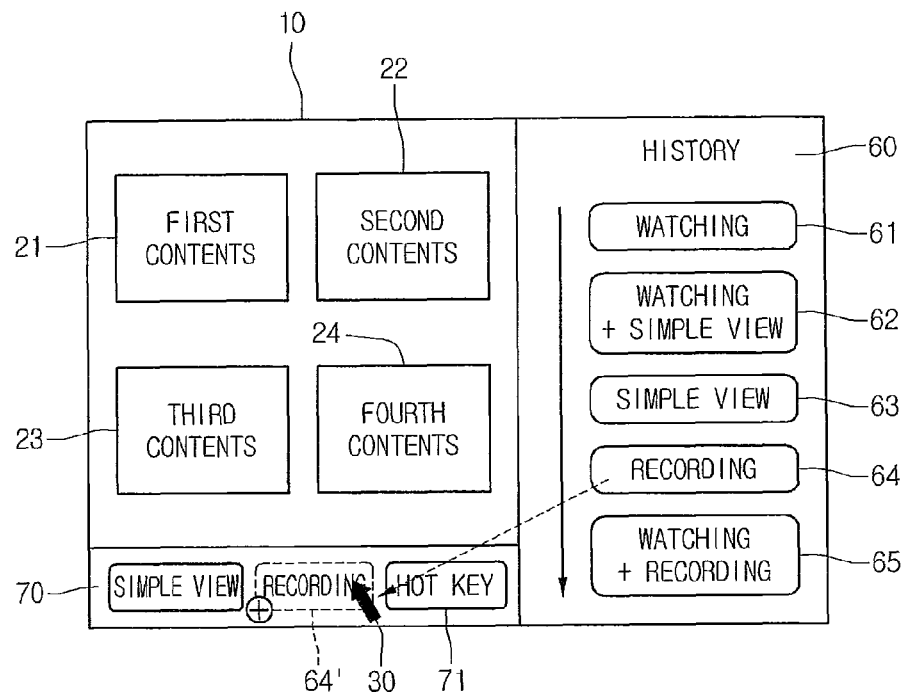

For example, as shown in FIGS. 16 and 17, a user may drag a "easy view" function image 63 among the plurality of functions displayed on the history area 60, and then, may drop it in the hot-key generation area 70, and also may drag a "recording" function image 64, and then, may drop it in the hot-key generation area 70 in order to select a hot-key button 71.

In this case, a multiple function area, that is, a hot-key, corresponding to the selected two functions, that is, the "watching" function and the "recording" function, may be generated.

Figure 18:
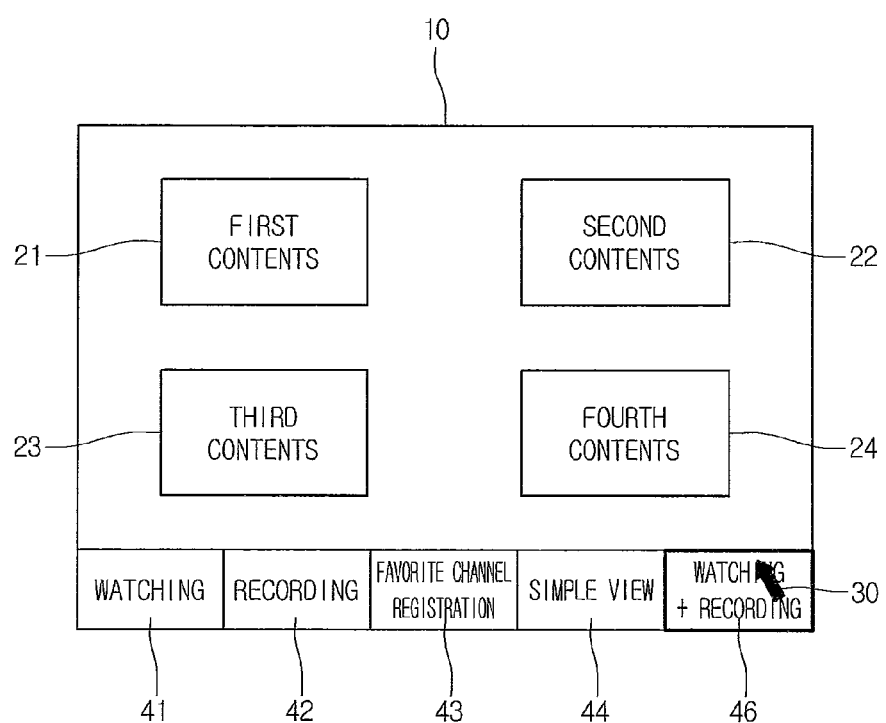

Referring to FIG. 18, a user may position a pointer 30 on one of a plurality of areas 41, 42, 43, 44, and 46 displayed on the screen 10, for a predetermined time, and accordingly, a performed date, time, or number may be displayed on the screen 10 as performance history information on a corresponding function.

For example, when a user positions the pointer 30 on the "watching+recording" function area 46 for more than 1 sec, a date, time, or number of the performed "watching+recording" function may be displayed on the screen 10.

Figure 19:
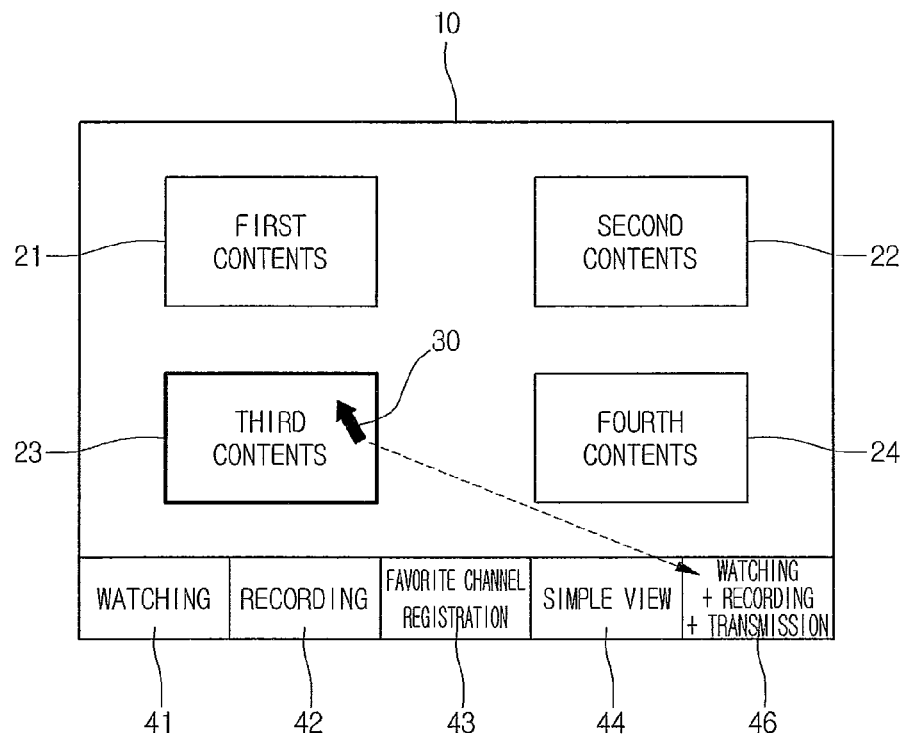
FIG. 19 is a view illustrating a method of performing a specific function on contents according to a sixth embodiment of the present invention.

Referring to FIG. 19, the multiple function area 46 may correspond to at least three functions, for example, a "watching" function, a "recording" function, and a "transmit" function, and a user may drag a specific contents image, and then, may drop the multiple function area 46 in order to perform the at least three functions.

For example, when a user drags a third contents image and drops it in the multiple function area 46, the "watching" function, the "recording" function, and the "transmit" function may be performed together on the third contents.

Figure 20:
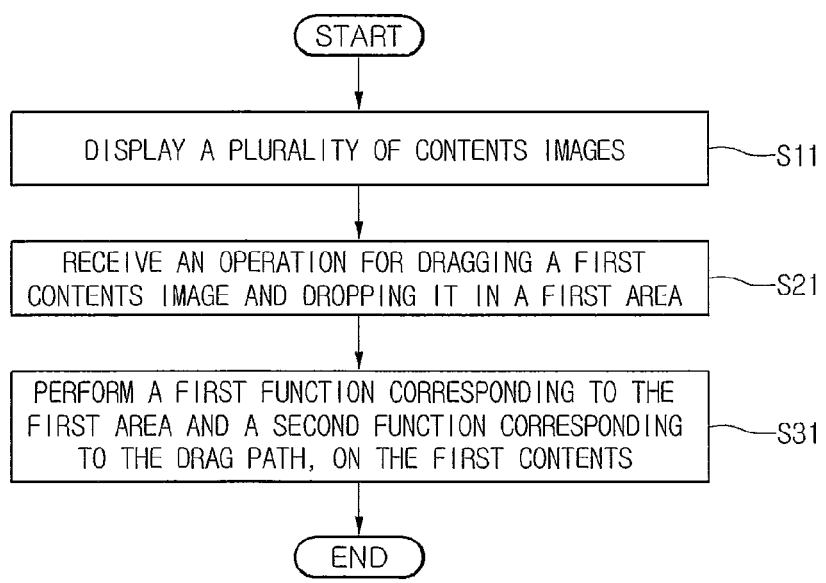
FIG. 20 is a flowchart illustrating a method of controlling contents according to another embodiment of the present invention.

FIG. 20 is a flowchart illustrating a method of controlling contents according to another embodiment of the present invention. The same contents described with reference to FIGS. 1 to 19 will not be described below.

Referring to FIG. 20, the contents playing device receives an input for displaying a plurality of images corresponding to a plurality of playable contents in operation S11, and dragging a first contents image among the plurality of contents images displayed, and dropping it in a first area in operation S21.

In response to the inputted drag and drop operation, the contents playing device performs a first function corresponding to the dropped first area and a second function corresponding to a path through which the first contents image 21 is dragged, on the first contents in operation S3.

Figure 21:
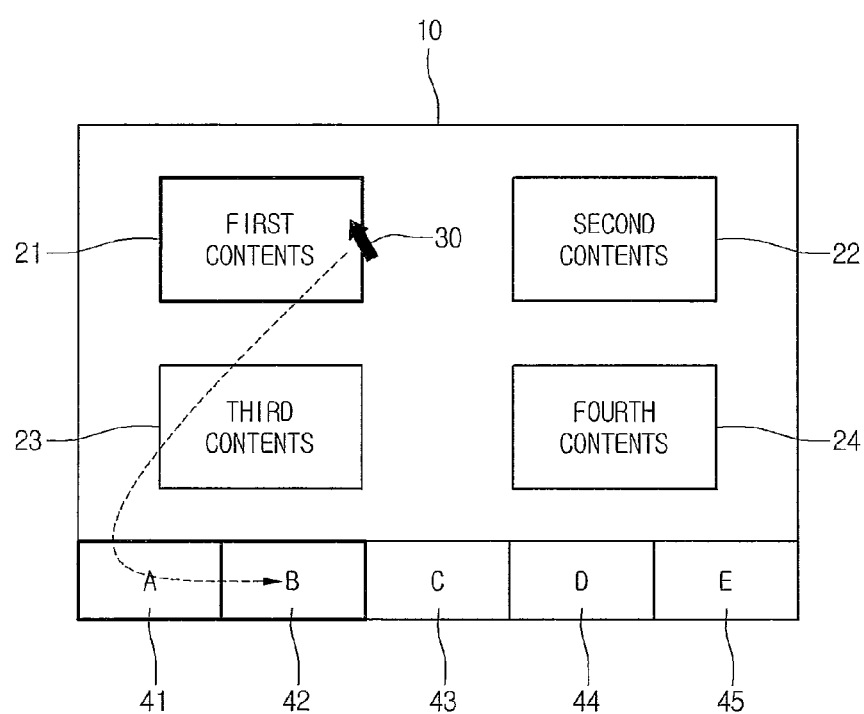
FIGS. 21 to 22 are views illustrating a method of performing a plurality of functions on contents according to an embodiment of the present invention.

Referring to FIG. 21, after selecting the first contents image 21, a user may move the selected first contents image 21 along the shown drag path (indicated with an arrow).

Figure 22:
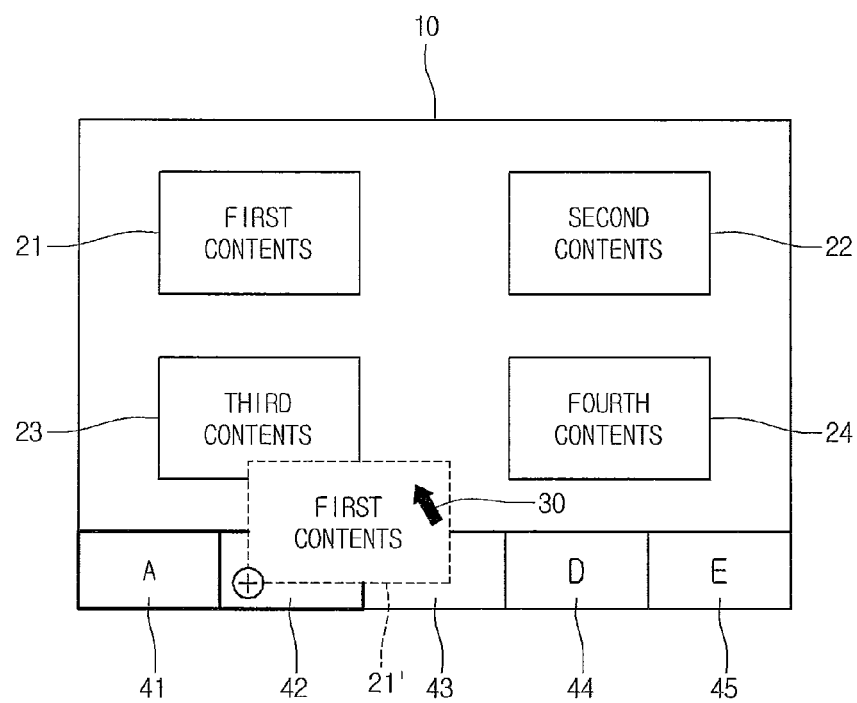

Referring to FIG. 22, when a user drops the first contents image 21 in the "B" function area 42 through the drag path, the "B" function corresponding to the dropped area 42 and the "A" function corresponding to the area 41 on the drag path may be performed on the first contents corresponding to the dragged image 21.

According to the above drag and drop operation, the "A" function and the "B" function may be simultaneously performed on the first contents, or may be sequentially performed according to a specific order with a time difference. Moreover, when the plurality of functions are performed sequentially, a user may designate and edit the order in which the plurality of functions are performed.

According to an embodiment of the present invention, when a user drags a contents image displayed on the screen 10 and drops it in a specific area, in addition to a function corresponding to the dropped area, and a function on a path through which the contents image is dragged may be performed together on corresponding contents.

Accordingly, in order to perform at least two functions on specific contents, a drag path of a corresponding contents image is set to pass through all areas having the functions displayed. Therefore, with a single drag and drop operation, a plurality of functions may be easily performed.

Hereinafter, embodiments for a method of controlling contents will be described in more detail with reference to FIGS. 23 to 31.

Figure 23:
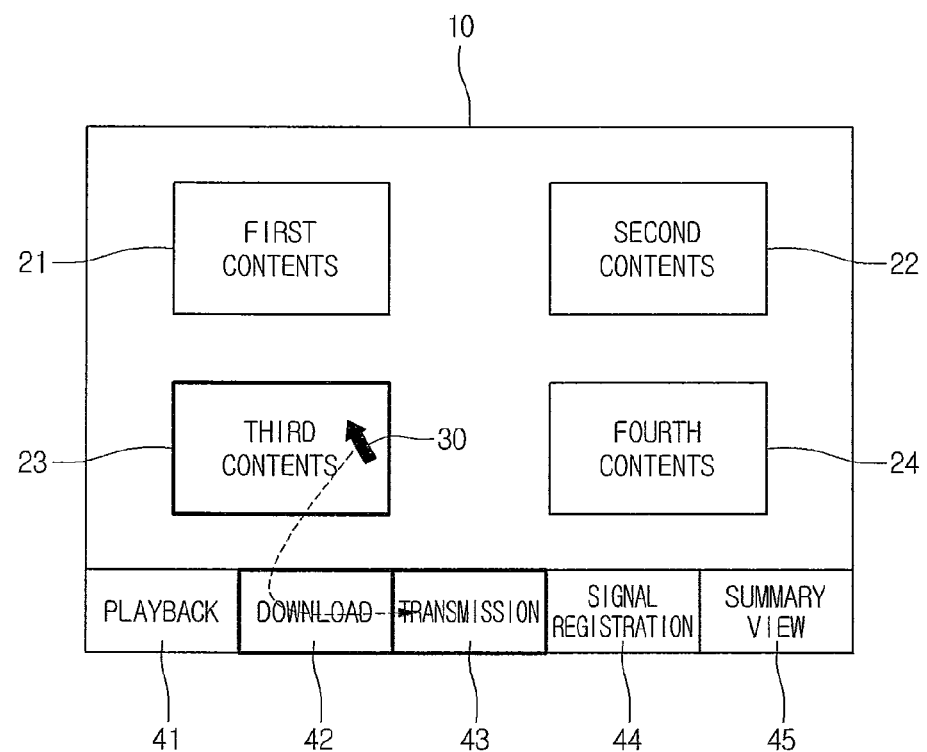
FIGS. 23 to 31 are views illustrating a method of performing a plurality of functions on contents according to other embodiments of the present invention.

FIG. 23 is a view illustrating a method of performing a plurality of functions on specific contents through a drag and drop operation. The same contents described with reference to FIGS. 1 to 22 will not be described below.

Referring to FIG. 23, a plurality of areas corresponding to each of a plurality of functions that may be performed on contents, that is, a "playback" function area 41, a "download" function area 42, a "transmit" function area 43, a "favorite registration" function area 44, and a "summary view" function area 45 may be displayed at the bottom of the screen 10.

According to an embodiment of the present invention, the number of the function areas 41 to 45, and the position or corresponding function of each function area may be changed by a user.

As shown in FIG. 23, a user may drag the third contents image 23, and then, may drop it in the "transmit" function area 43 after passing through the "download" function area 42. Accordingly, the "download" function corresponding to the area 42 on the drag path and the "transmit" function corresponding to the dropped area 43 may be performed on the third contents.

For example, through the mentioned drag and drop operation, as the third contents are downloaded, they may be transmitted to an external device, for example, a device having an IP address registered by a user.

Moreover, the order in which the plurality of functions is performed may be determined by a drag and drop operation inputted by a user. For example, as shown in FIG. 23, when a user drags the third contents image 23 and then drops it in the "transmit" function area 43 after passing through the "download" function area 42, the "download" function on the drag path may be performed first and then the "transmit" function of the dropped area may be performed on the third contents.

According to an embodiment of the present invention, a user may perform at least three functions on specific contents through a single drag and drop operation.

Figure 24:
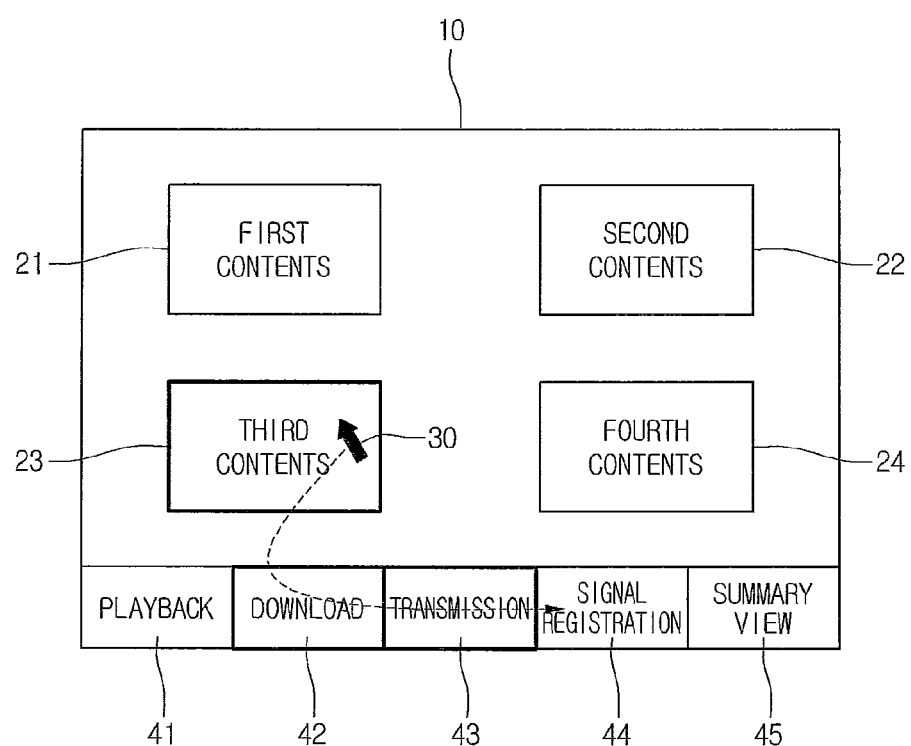

As shown in FIG. 24, a user may drag the third contents image 23, and then, may drop it in the "favorite registration" function area 44 after sequentially passing through the "download" function area 42 and the "transmit" function area 43. Accordingly, the "download" function and "transmit" function on the drag path in addition to the "favorite registration" function of the dropped area may be performed on the third contents.

FIGS. 25 to 28 are views illustrating a method of performing a plurality of functions according to other embodiments of the present invention.

Figure 25:
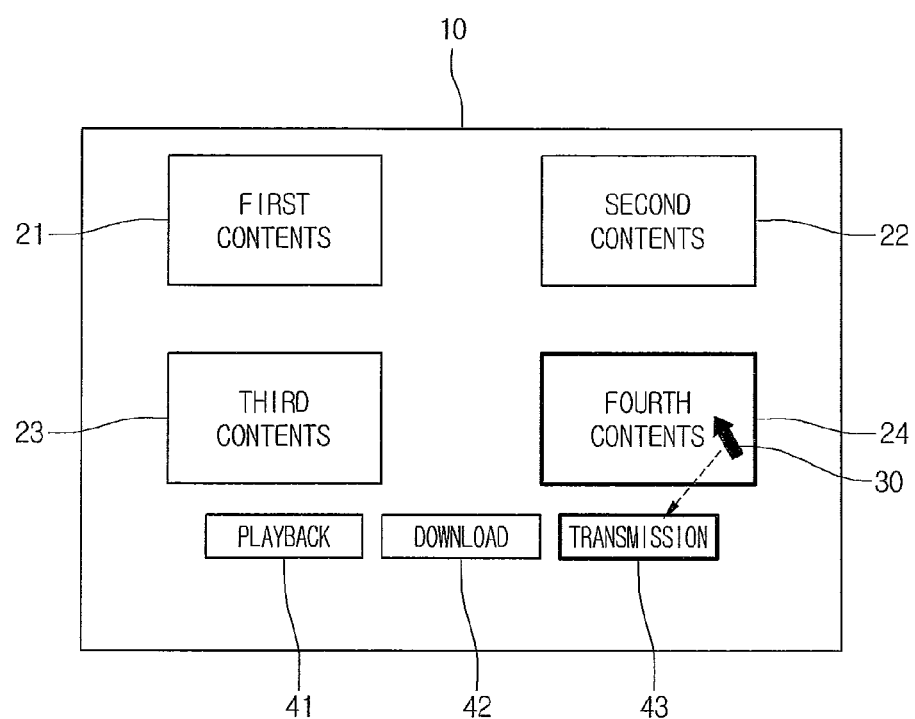

Referring to FIG. 25, a plurality of images 21 to 24 and areas 41, 42, and 43 respectively corresponding to a plurality of functions, that is, "playback" "download" and "transmit" functions, may be displayed on the screen 10.

According to an embodiment of the present invention, when a user drags a specific contents image among the plurality of contents images 21 to 24 and passes through one of the functions areas 41, 42, and 43, a function corresponding to a function area on the drag path and at least one sub function to be performed may be displayed on the screen 10.

For example, as shown in FIG. 25, when a user drags a fourth contents image 24 and position it on the "transmit" function area 43, sub functions that could be performed together with the "transmit" function may be displayed on the screen 10.

Figure 26:
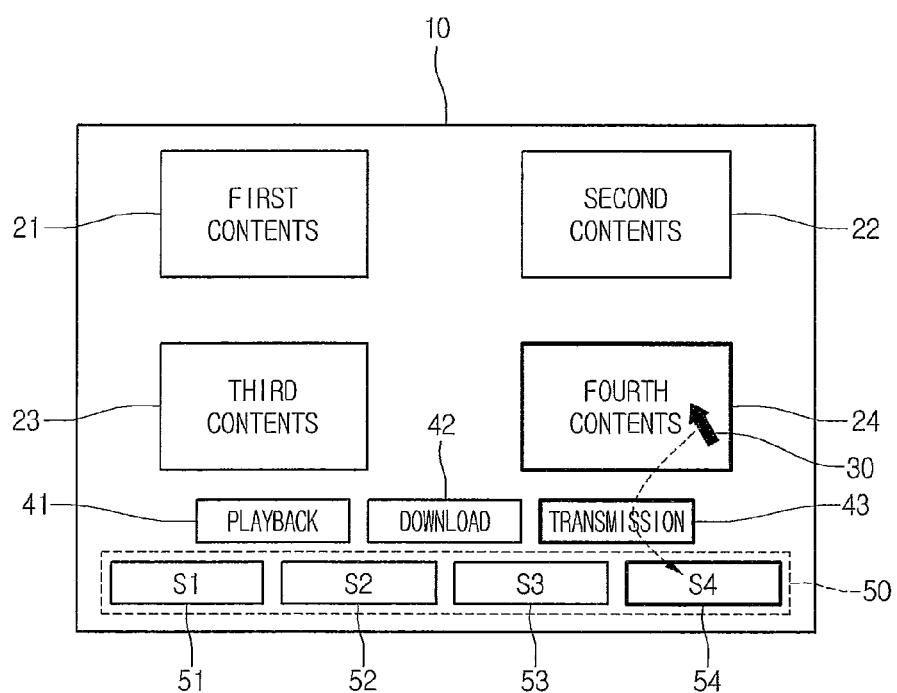

Referring to FIG. 26, when a user drags a fourth contents image 24 and passes through the "transmit" function area 43, sub functions 50, that is, "S1" to "S5" functions, relating to the "transmit" function, which were not previously displayed on the screen 10, may be displayed at the bottom of the screen 10.

In this case, a user may drop the fourth contents image 24, which is dragged across the "transmit" function area 43, in a desired area, for example, the "S4" function area 54, among the plurality of sub function areas 51 to 54. Accordingly, the "transmit" function on the drag path and the "S4" function of the dropped area may be performed on the fourth contents.

In order to automatically display the above sub functions, at least one sub function on each of a plurality of functions initially displayed on the screen 10 may be configured in advance.

Moreover, a sub function that is available together with the "transmit" function may include a function for designating the receiver of the selected contents.

Figure 27:
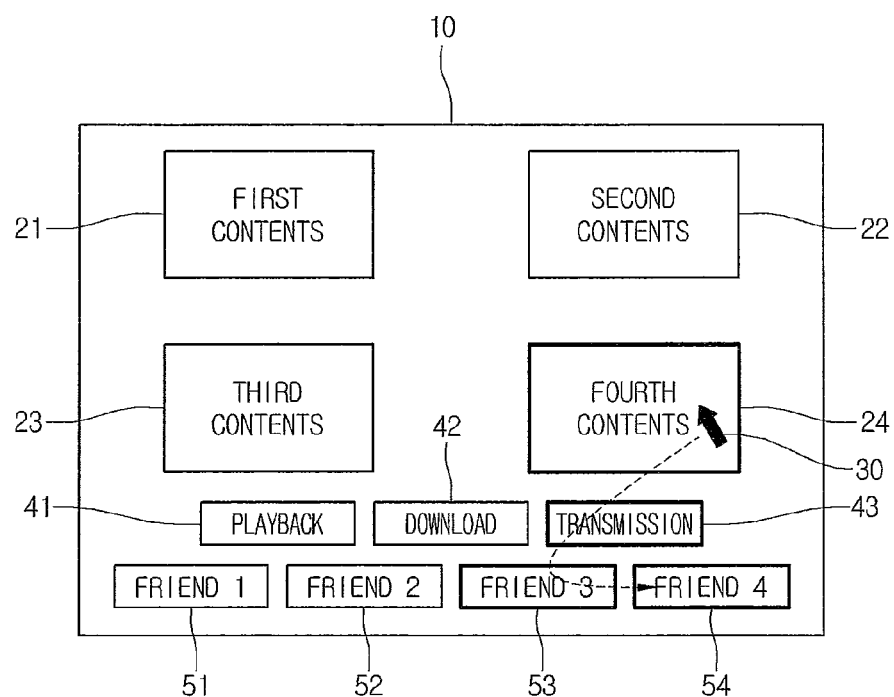

Referring to FIG. 27, when a user drags the fourth contents image 24 and positions it in the "transmit" function area 43, a list of receivers 51 to 54, which were previously not displayed, may be displayed on the screen 10. Accordingly, a user may drop the fourth contents image 24, which is dragged across the "transmit" function area, in at last one of the receivers 51 to 54.

For example, a user may drag the fourth contents image 24, and then, may drop it in the area 53 corresponding to a "friend 3", where the fourth contents are to be transmitted, among the receivers 51 to 54 on the screen 10, after passing through the "transmit" function area 43. Accordingly, the fourth contents may be transmitted to the "friend 3".

Furthermore, as shown in FIG. 27, a user may drag the fourth contents image 24, and then, may drop it in the "friend 4" area 54 after passing through the "transmit" function area 43 and the "friend 3" area 53 on the screen. Accordingly, the fourth contents may be transmitted to the "friend 3" and "friend 4".

The list of receivers, for example, "friend 1", "friend 2", "friend 3", and "friend 4", may include receivers pre-registered by a user, and also may include information on external devices respectively corresponding to the receivers, for example, IP address or device information.

Accordingly, when there is a user's contents transmitting request, the contents playing device may transmit corresponding contents to the external device of a corresponding receiver by using the stored external device information.

Moreover, a sub function that is available together with the "playback" function may include a function for designating the display resolution of the selected contents.

Figure 28:
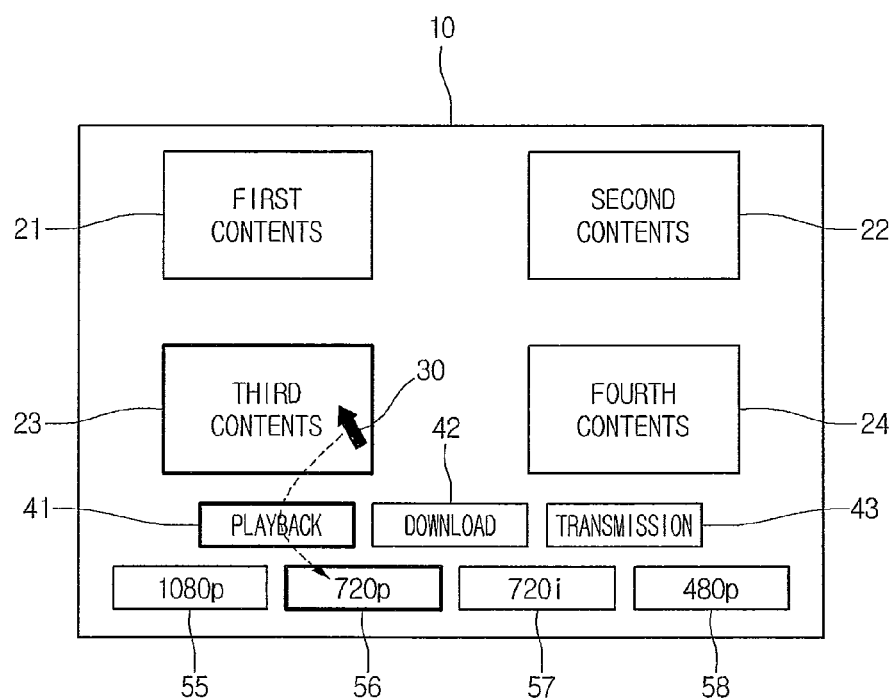

Referring to FIG. 28, when a user drags the third contents image 23 and positions it in the "playback" function area 41, display resolutions 55 to 58, which were previously not displayed, may be displayed on the screen 10. Accordingly, a user may drop the third contents image 23, which is dragged across the "playback" function area 41, in at last one of the resolutions 55 to 58.

For example, a user may drag the third contents image 23, and then, may drop it in the area 55 corresponding to a "720p" resolution, at which the third contents are to be displayed, among the resolutions 55 to 58 on the screen 10, after passing through the "playback" function area 41. Accordingly, the third contents may be played at the "720p" resolution.

The resolutions, for example, "1080p", "720p", "720i" and "480p", may be available resolutions for contents that a user selects, which are provided from a Contents Provider (CP), and for this, the contents playing device may receive available resolution information on each contents from a server of a resolution CP.

Figure 29:
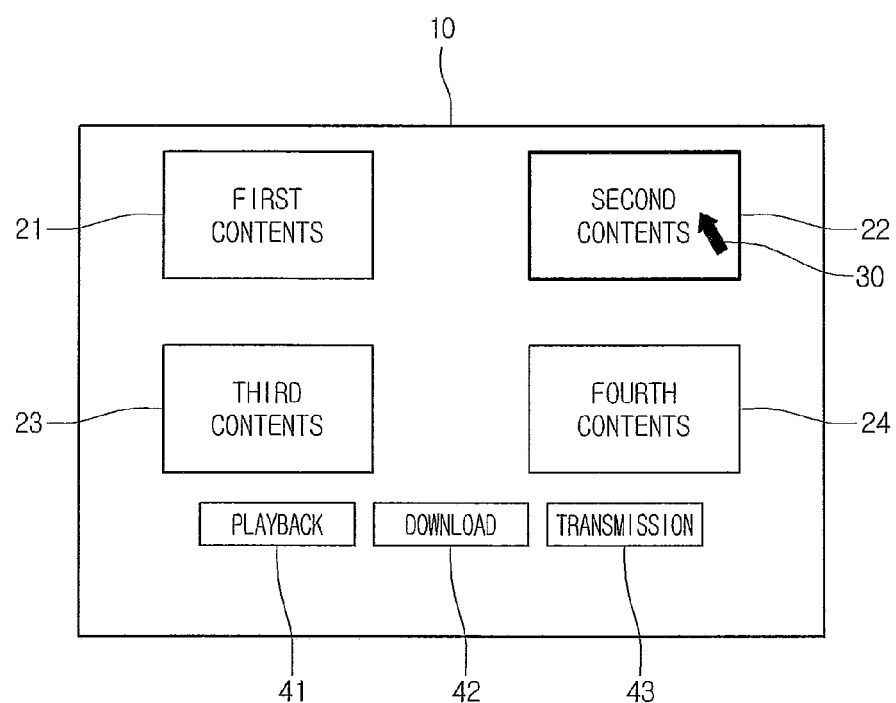
Figure 30:
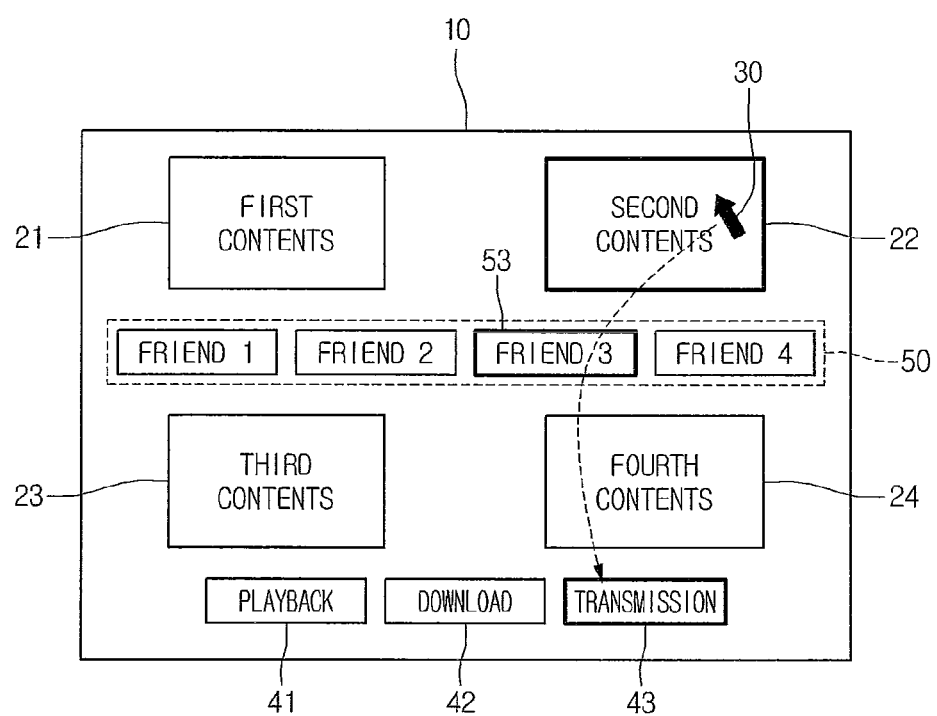
Figure 31:
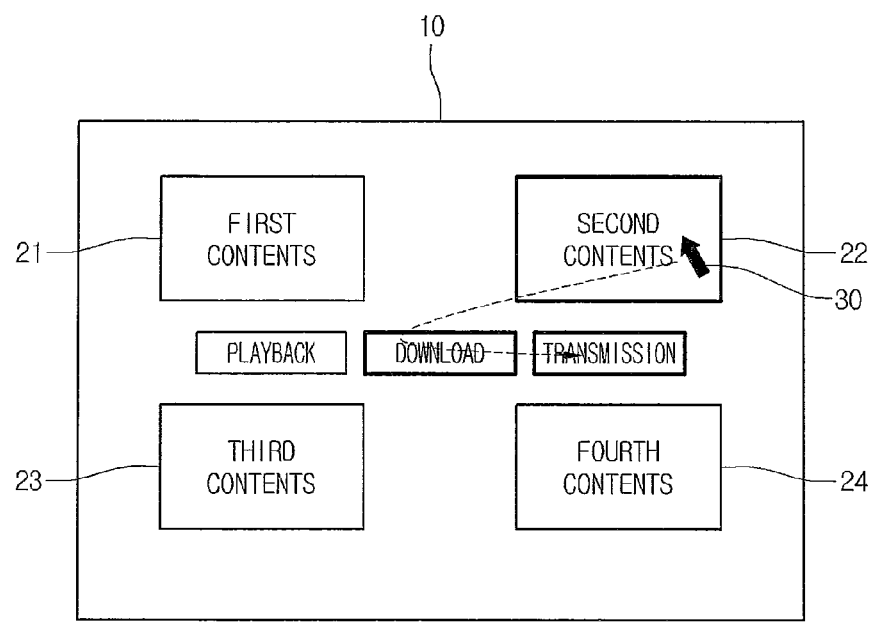

FIGS. 29 to 31 are views illustrating a method of performing a plurality of functions according to other embodiments of the present invention.

Referring to FIG. 29, a plurality of images 21 to 24 and areas 41, 42, and 43 respectively corresponding to a plurality of functions, that is, "playback" "download" and "transmit" functions, may be displayed on the screen 10.

According to an embodiment of the present invention, when a user selects one of the plurality of contents images to 24, at least one sub function available for the selected contents may be displayed on the screen 10.

For example, as shown in FIG. 29, when a user selects a second contents image 22 sub functions that could be performed on the selected second contents may be displayed on the screen 10.

Referring to FIG. 30, when a user selects the second contents image 22, sub functions 50, which could be performed on the second contents but were not previously displayed, for example, a list of receivers 51 to 54 where the second contents are transmitted, may be displayed on the screen 10.

In more detail, when a user selects the second contents image 22, the plurality of contents images 21 to 24 may be divided into first groups 21 and 22 including the selected second contents and the remaining second groups 23 and 24.

Moreover, a receiver list 50, that is, the above mentioned sub functions, may be displayed between an area where the first group, that is, the first and second contents images 21 and 22, is displayed and an area where the second group, that is, the third and fourth contents images 23 and 24, is displayed. Accordingly, selecting a sub function may become easier.

For example, after selecting the second contents image 22, a user may drop it in the "transmit" function area 43 through the "friend 3" area 53, where the second contents are transmitted, in the list of receivers 51 to 54 on the screen 10. Accordingly, the second contents may be transmitted to the "friend 3".

Additionally, as shown in FIG. 31, when a user selects the second contents image 24, functions displayed at the bottom of the screen 10, that is, a "playback" function, a "download" function, and a "transmit" function, may be displayed between the first and second images 21 and 22 of the separated first group and the third and fourth contents images 23 and 24 of the separated second group.

Accordingly, a user may drag the selected second contents image 24 in order to easily perform a desired function, for example, a "download" function and a "transmit" function, without passing through an area having other contents images displayed.

Figure 32:
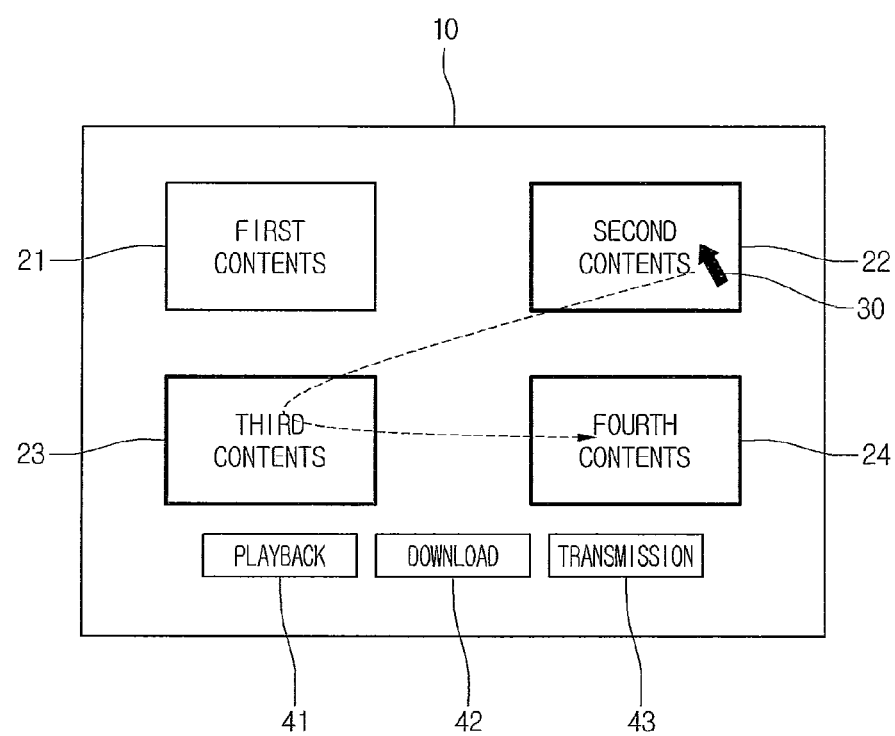
FIGS. 32 to 33 are views illustrating a method of playing a plurality of contents together according to an embodiment of the present invention.
Figure 33:
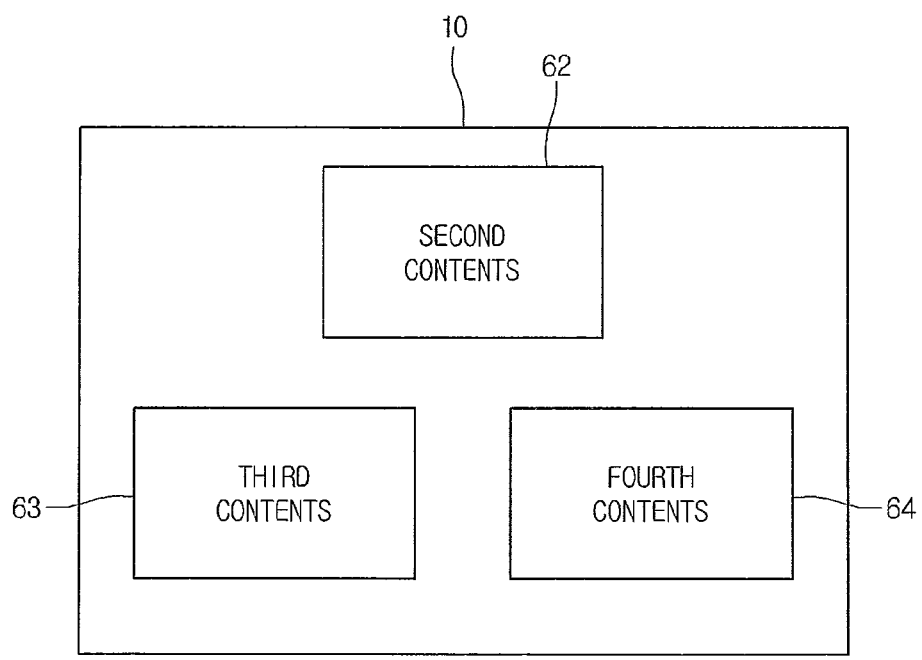

FIGS. 32 to 33 are views illustrating a method of playing a plurality of contents according to an embodiment of the present invention.

According to an embodiment of the present invention, a user may drag one contents image among the plurality of contents images displayed on the screen 10, and may drop it in an area having other contents images displayed, and through the above drag and drop operation, two contents respectively corresponding to the dragged image and the dropped area may be played simultaneously.

Additionally, as shown in FIG. 32, when a user drags the second contents image 22 and drops it in an area having the fourth contents image 24 displayed through an area having the third contents image 23 displayed, the third contents corresponding to the drag path may be played in addition to the second contents and the fourth contents.

That is, according to the above drag and drop path, as shown in FIG. 33, the second contents image 62, the third contents image 63, and the fourth contents image 64 may be simultaneously displayed on the screen 10.

Figure 34:
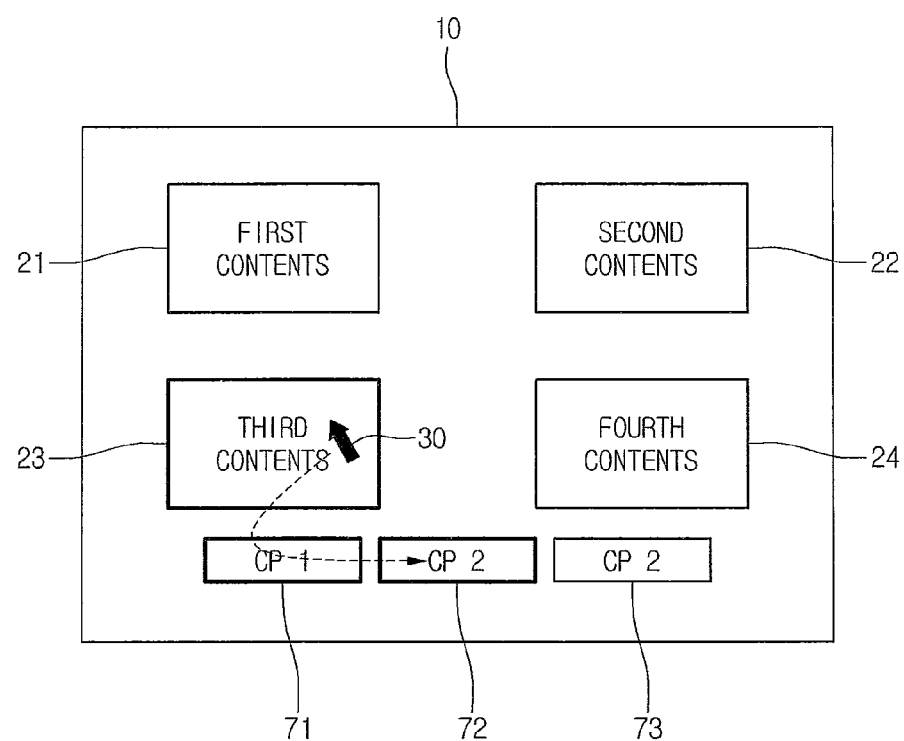
FIGS. 34 to 36 are views illustrating a method of performing a plurality of functions on contents according to other embodiments of the present invention.
Figure 35:
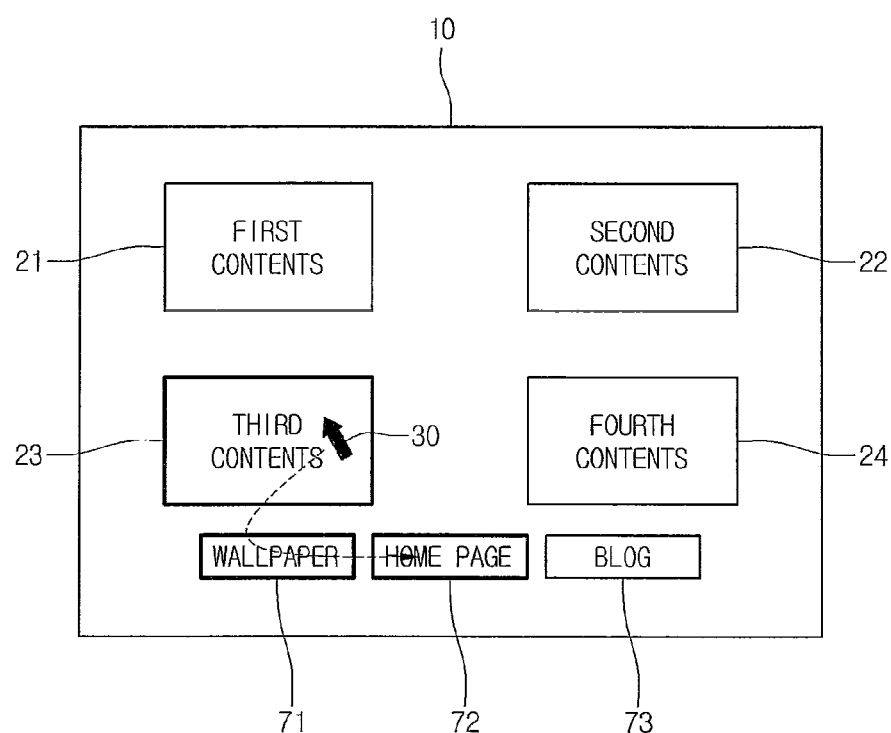
Figure 36:
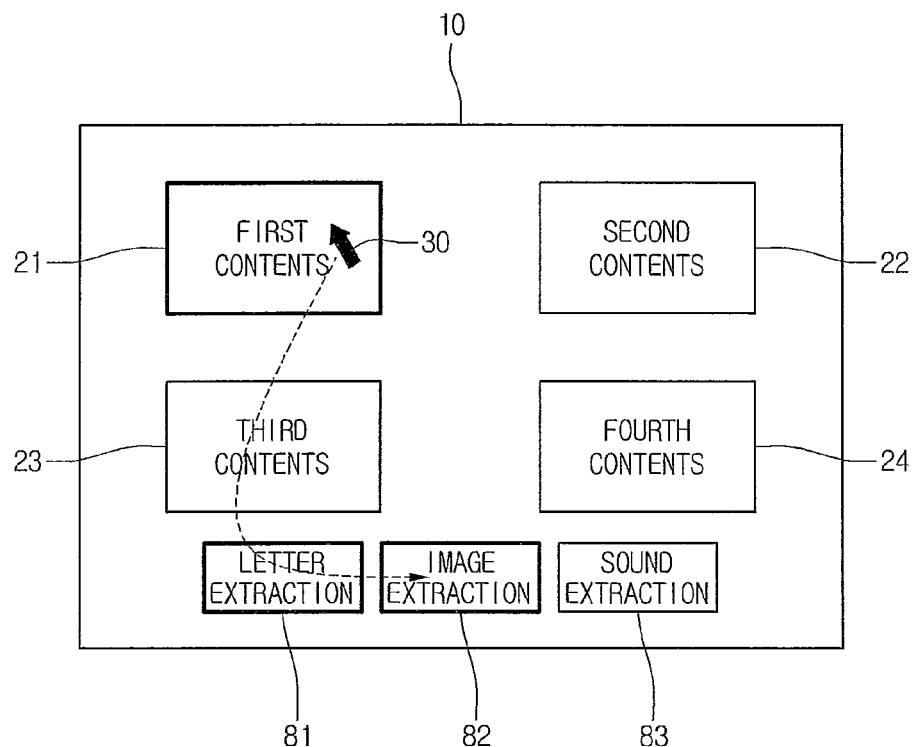

FIGS. 34 to 36 are views illustrating a method of performing a plurality of functions according to other embodiments of the present invention.

Referring to FIG. 34, a plurality of functions displayed on the screen 10 may respectively correspond to specific CPs.

That is, CP areas 71, 72, and 73 respectively corresponding to a plurality of CPS may be displayed on the screen 10, and a user may drag a specific contents image, and then, may drop it in an area for providing a desired function among the plurality of CP areas 71, 72, and 73 in order to perform a function that a corresponding CP provides on corresponding contents.

For example, when a user drags the third contents image 23 and drops it in the "CP 1" area 71, the contents playing device may connect to a server of the "CP 1" via a wired/wireless network such as internet, and then, may performs a function that a CP corresponding to the "CP 1" provides on the third contents.

Additionally, as shown in FIG. 34, when a user drags the third contents image 23 and then drops it in the "CP 2" area through the "CP 1" area 71, a first function that the first CP CP1 provides and a second function that the second CP CP2 provides may be performed on the third contents.

Referring to FIG. 35, a plurality of functions that at least one CP provides, that is, a "wallpaper" function, a "homepage" function, and a "blog" function, may be displayed on the screen 10.

For example, the wallpaper" function may be a wallpaper setting service provided from the first CP CP1, the "homepage" function may be a homepage management service provided from the second CP CP2, and the "blog" function may be a personal blog management service provided from the third CP CP3.

As shown in FIG. 35, when a user drags the third contents image 23 and then drops it in the "CP 72" area through the "wallpaper" area 71, the wallpaper setting service provided from the first CP CP1 and the homepage management service provided from the second CP CP2 may be applied to the third contents.

In more detail, the image of the third contents may be set as the wallpaper of the contents playing device or a portable terminal, and the third contents may be transmitted to a server of the second CP CP2 and then uploaded as the user's homepage.

According to another embodiment of the present invention, a plurality of functions displayed on the screen 10 may include a function for extracting part of images, sounds, and letters in specific contents.

Referring to FIG. 36, a "letter extraction" function for extracting only letters from the contents that a user selects and playing or storing them, an "image extraction" function for extracting only image data and playing or storing them, and a "sound extraction" function for extracting only sound data and playing or storing them may be displayed on the screen 10.

For example, when a user drags the first contents image 21 and drops it in the "letter extraction" area 81, only the letter data are extracted from the first contents, and then, played or stored.

Additionally, as shown in FIG. 36, when a user drags the first contents image 21 and drops it in the "image extraction" area 82 through the "letter extraction" area 81, letter data and image data are extracted from the first contents and letters and images are played or stored.

Moreover, at least one of a plurality of contents played through a contents controlling method according to the present invention may include an image of a broadcast channel received.

Figure 37:
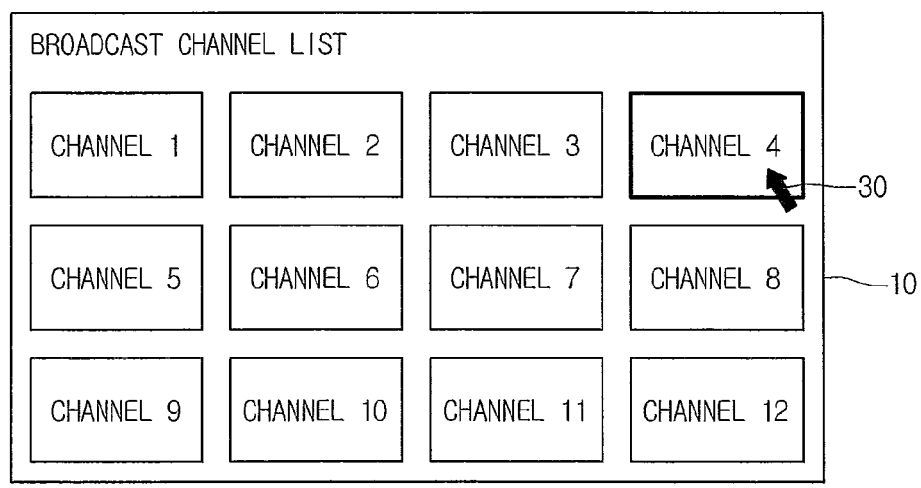
FIG. 37 is a view illustrating a method of displaying information on a plurality of broadcast channels according to an embodiment of the present invention.

FIG. 37 is a view illustrating a method of displaying information on a plurality of broadcast channels according to an embodiment of the present invention.

Referring to FIG. 37, information corresponding to a plurality of reception available broadcast channels, that is, first to twelfth channels, may be displayed on the screen 10.

The displayed broadcast channel information may include the broadcasting station name of a corresponding channel, a channel number, the name of contents broadcasted currently or at a specific time slot in the channel, or the contents, in a letter or image form.

According to an embodiment of the present invention, information on a plurality of broadcast channels displayed on the screen 10 may be provided to a channel browser including an image corresponding to an image of each broadcast channel, in more detail, a thumbnail image or a movie clip.

A user may select one of information on broadcast channels displayed on the screen 10 in order to play the contents of a desired channel.

For example, as shown in FIG. 37, a user may move a pointer 30 through an input means and may position it on information corresponding to a desired channel, in order to select a corresponding channel.

Figure 38:
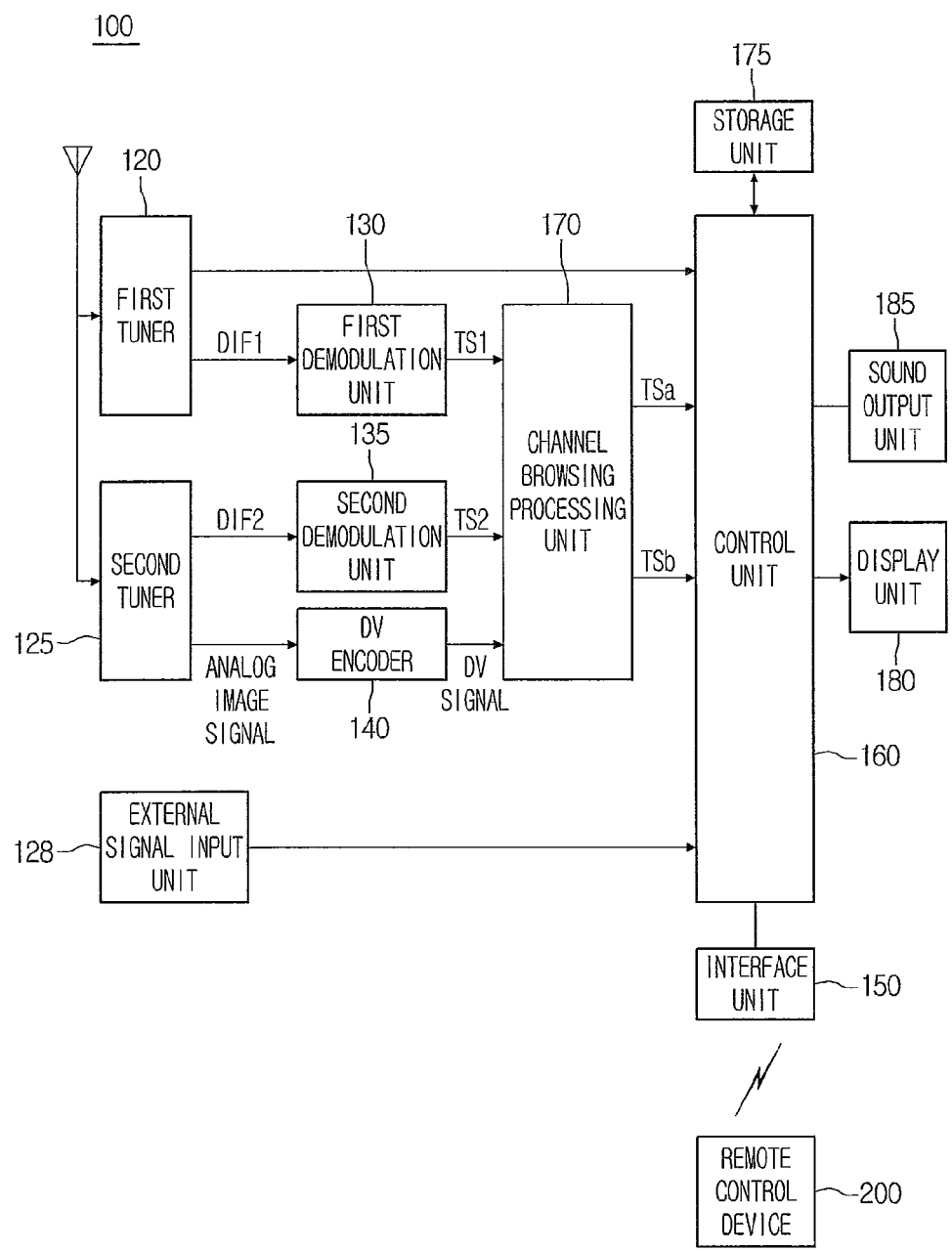
FIG. 38 is a block diagram illustrating a configuration of a display device according to an embodiment of the present invention.

FIG. 38 is a block diagram illustrating a configuration of a display device according to an embodiment of the present invention. That is, a contents playing device for a contents controlling method is shown.

Referring to FIG. 38, the display device 100 may include a first tuner 120, a second tuner 125, an external signal input unit 128, a first demodulation unit 130, a second demodulation unit 135, an analog/digital conversion unit 140, an interface unit 150, a control unit 160, a channel browsing processing unit 170, a storage unit 175, a display unit 180, and a sound output unit 185.

The first tuner 120 selects a Radio Frequency (RF) broadcast signal corresponding to a channel selected by a user among RF broadcast signals received through an antenna, and converts the selected RF broadcast signal into an intermediate frequency signal or baseband image/sound signal.

For example, if the selected RF broadcast signal is a digital broadcast signal, it is converted into a digital IF signal DIF1. If the selected RF broadcast signal is an analog broadcast signal, it is converted to an analog baseband image/sound signal CVBS 1/SIF. That is, the first tuner 120 may be a hybrid tuner for processing a digital broadcast signal and an analog broadcast signal. The analog baseband image/sound signal CVBS 1/SIF outputted from the first tuner 120 may be inputted to the control unit 160.

Additionally, the first tuner 120 may receive a single-carrier RF broadcast signal according to an Advanced Television Systems Committee (ATSC) method or a multiple-carrier RF broadcast signal according a Digital Video Broadcasting (DVB) method.

Similar to the first tuner 120, the second tuner 120 selects a Radio Frequency (RF) broadcast signal corresponding to a channel selected by a user among RF broadcast signals received through an antenna, and converts the selected RF broadcast signal into an intermediate frequency signal or baseband image/sound signal.

Moreover, the second tuner 125 may periodically and sequentially select a RF broadcast signal corresponding to all broadcast channels pre-stored through a channel memory function, in order to convert the selected RF broadcast signal into an intermediate frequency signal or baseband image/sound signal. According to an embodiment of the present invention, an image of pre-stored another channel is displayed on at least a portion of the screen in a thumbnail form, and accordingly, it is possible to sequentially/periodically receive RF broadcast signals of all pre-stored channels.

For example, the first tuner 120 converts a main RF broadcast signal that a user selects into an intermediate frequency signal or a baseband image/sound signal, and the second tuner 125 sequentially/periodically selects all RF broadcast signal (sub RF broadcast signals) except the main RF broadcast signals or all RF broadcast signals, in order to convert it into an intermediate frequency signal or a baseband image/sound signal.

The first demodulation unit 130 receives the digital IF signal DIF 1 converted from the first tuner 120 and performs a demodulation operation.

For example, when the digital IF signal DIF 1 converted from the first tuner 120 is an ATSC type, the first demodulation unit 130 performs an 8-Vestigal Side Band (8-VSB) demodulation. Additionally, the first demodulation unit 130 may perform a channel demodulation.

For this, the first demodulation unit 130 may include a Trellis decoder, a de-interleaver, and a Reed Solomon decoder, in order to perform Trellis decoding, de-interleaving, and Reed Solomon decoding.

For example, when the digital IF signal DIF 1 converted from the first tuner 120 is the ATSC type, the first demodulation unit 130 performs an 8-Vestigal Side Band (8-VSB) demodulation. Additionally, the first demodulation unit 130 may perform a channel demodulation.

For this, the first demodulation unit 130 may include a convolution decoder, a de-interleaver, and a Reed Solomon decoder, in order to perform convolution decoding, de-interleaving, and Reed Solomon decoding.

The external signal input unit 128 may perform a signal input with an external device. For this, the external signal input unit 128 may include an A/V input/output unit and a wireless communication unit.

The external signal input unit 128 may be connected to an external device such as a Digital Versatile Disk (DVD), a Blu ray, a game console, a camcorder, and a computer (notebook computer) in order to deliver an external input image signal, an external input sound signal, and an external input data signal to the control unit 160 in the display device 100. Additionally, the image signal, sound signal, and data signal processed in the control unit 160 may be outputted to another external device.

In order to receive an input/output of a image/sound signal from an external device, the A/V input/output unit may include an Ethernet terminal, a USB terminal, a Composite Video Banking Sync (CVBS) terminal, a component terminal, a S-video terminal (analog), a Digital Visual Interface (DVI) terminal, a High Definition Multimedia Interface (HDMI) terminal, an RGB terminal, a D-SUB terminal, an IEEE 1394 terminal, a SPDIF terminal, and a Liquid HD terminal.

Moreover, although not shown in the drawings, various input signals inputted through the external signal input unit 128 may be inputted to the channel browsing processing unit 170, and then, thumbnail image extraction processing may be performed thereon.

For example, an analog signal inputted through the CVBS terminal and the S-video terminal, as mentioned above, may be converted into a digital signal, and then, may be inputted to the channel browsing processing unit 170. A digital signal inputted through any other input terminals may be directly inputted to the channel browsing processing unit 170 without analog/digital conversion.

Here, the digital signal outputted from the external signal input unit 128 may be a stream signal, for example, an MPEG-2 Transprt Stream (TS) where an image signal of an MEPG-2 standard and a sound signal of a Dolby AC-3 standard are multiplexed.

A wireless communication unit may perform a wireless internet access. For example, for a wireless internet access, Wireless LAN (WLAN) (Wi-Fi), Wireless broadband (Wibro), World Interoperability for Microwave Access (Wimax), and High Speed Downlink Packet Access (HSDPA) may be used.

Additionally, a wireless communication unit may perform a short-range wireless communication with another electronic device. For example, Bluetooth, Radio Frequency Identification (RFID), IrDA, infrared Data Association, Ultra Wideband (UWB), and ZigBee may be used.

Moreover, the external signal input unit 128 may perform an input/output operation with a settop box in access to the settop box through at least one of the above terminals.

For example, if the settop box is for an Internet Protocol (IP) TV, in order to provide bi-directional communication, image, sound, and data signals processed in the settop box for IP TV may be delivered to the control unit 160, and signals processed in the control unit 160 may be delivered to the settop box for IPTV.

Moreover, the image, sound, and data signals processed in the settop box for IPTV may be processed in the control unit 160 through the channel browsing processing unit 170.

Furthermore, the IPTV may include an ADSL-TV, a VDSL-TV, and an FTTH-TV according to the type of a transport network, and also may include a TV over DSL, a Video over DSL, a TV overIP (TVIP), and a Broadband TV (BTV). Additionally, the IPTV may include an internet access available internet TV and a full browsing TV.

The first demodulation unit 130 may perform demodulation and channel decoding, and may output a stream signal TS 1. The stream signal TS 1 at this point may be a signal in which image signals, sound signals, and data signals are multiplexed. For example, the stream signal TS 1 may be an MPEG-2 Transprt Stream (TS) in which an image signal of an MEPG-2 standard and a sound signal of a Dolby AC-3 standard are multiplexed. In more detail, the MPEG-2 TS may include a 4 byte header and a 184 byte payload.

The stream signal TS1 is inputted to the control unit 160, and then, demultiplexing and signal processing are performed thereon. According to an embodiment of the present invention, before being inputted to the control unit 160, the stream signal TS1 is inputted to the channel browsing processing unit 170 and then is processed for channel browsing. A channel browsing operation will be described later.

Moreover, the above-mentioned first demodulation unit 130 may be separately equipped depending the ATSC type and the DVB type. That is, the first demodulation unit 130 may be divided into an ATSC demodulation unit and a DVB demodulation unit.

The second demodulation unit 135 receives the digital IF signal DIF 2 converted from the first tuner 125 in order to perform a demodulation operation, and then, outputs a stream signal TS 2. Since an operation of the second demodulation unit 150 is identical to that of the first demodulation unit 130, its description will be omitted.

Moreover, when a signal outputted from the second tuner 125 is an analog baseband image signal CVBS 2, the analog/digital conversion unit 140 needs to convert the signal into a digital signal.

The analog/digital conversion unit 140 converts an inputted analog signal into a digital signal. When an inputted signal is image signal, it is converted into a digital image signal DV through sampling and quantization. The converted digital signal may be an unencrypted signal. The converted digital image signal DV is inputted to the channel browsing processing unit 170 and then is processed.

The interface unit 150 delivers an input signal from a user to the control unit 160 or from the control unit 160 to a user. For example, the interface unit 150 may receive a user input signal such as power on/off, channel selection, screen setting from the remote control device 200, or may transmit a signal from the control unit 160 to the remote control device 200 according to various communication types such as a Radio Frequency communication type and an IR communication type.

The control unit 160 demultiplexes the inputted stream, and signal-processes the demultiplexed signals in order to generate and output a signal for image and sound output. In addition to that, the control unit 160 may control general operations of the display device 100.

Although not shown in the drawings, the control unit 160 may include a demultiplexing unit, an image processing unit, a sound processing unit, and a user input signal processing unit.

The control unit 160 may demultiplex an inputted stream signal, for example, MPEG-2 TS, in order to divide the stream signal into an image signal, a sound signal, and a data signal.

Additionally, the control unit 160 may perform image processing on the demultiplexed image signal. For example, when the demultiplexed image signal is an encoded image signal, it may be decoded. In more detail, when the demultiplexed image signal is an encoded image signal of the MEPG-2 standard, it may be decoded by an MPEG-2 decoder. Additionally, when the demultiplexed image signal is an encoded image signal of the H.264 standard according to a Digital Multimedia Broadcasting (DMB) type or DVB-H, it may be decoded by an H.264 decoder.

Additionally, the control unit 160 may process the brightness, tint, and color adjustment of an image signal.

The image signal image-processed by the control unit 160 is inputted to the display unit 180, and then is displayed. Additionally, the image signal may be inputted to an external output terminal connected to an external output device.

Additionally, the control unit 160 may perform sound processing on the demultiplexed sound signal. For example, when the demultiplexed sound signal is an encoded sound signal, it may be decoded. In more detail, when the demultiplexed sound signal is an encoded sound signal of the MEPG-2 standard, it may be decoded by an MPEG-2 decoder.

Additionally, when the demultiplexed sound signal is an encoded sound signal of the MPEG 4 Bit Sliced Arithmetic Coding (BSAC) standard according to a Digital Multimedia Broadcasting (DMB) type, it may be decoded by an MPEG 4 decoder. Additionally, when the demultiplexed sound signal is an encoded sound signal of the MPEG 2 Advanced Audio Codec (AAC) standard according to DMB type or DVB-H, it may be decoded by an AAC decoder.

Additionally, the control unit 160 may process Base, Treble, and volume adjustments.

The sound signal processed by the control unit 160 is inputted to the sound output unit 185, for example, a speaker, and then, is outputted for sound. Additionally, the sound signal may be inputted to an external output terminal connected to an external output device.

Additionally, the control unit 160 may perform data processing on the demultiplexed sound signal. For example, when the demultiplexed data signal is an encoded data signal, it may be decoded. The encoded data signal may be Electronic Program Guide (EPG) information including broadcast information such as the start time and end time of a broadcast program broadcasted in each channel.

For example, the EPG information may be ATSC-Program and System Information Protocol (TSC-PSIP) information in the case of the ATSC type, and may include DVB-Service Information (DVB-SI) in the case of the DVB type. The ATSC-PSIP information or DVB-SI information may be information included in the stream, that is, the header (4 byte) of the MPEG-2 TS.

Additionally, the control unit 160 may perform On Screen Display (OSD) processing. In more detail, the control unit 160 may generate a signal for displaying various information as graphic or text on the screen of the display unit 180, on the basis of at least one of an image-processed image signal and a data-processed data signal and a user input signal from the remote control device 200. In addition to the image-processed image signal and the data-processed data signal, the generated signal may be inputted to the display unit 180.

The signal generated for graphic and text display may include various data such as user interface screens, various menu screens, widgets, and icons of the display device 100.

The channel browsing processing unit 170 may perform a browsing process on at least one of a broadcast signal corresponding to a received channel and various input image signals inputted through the external signal input unit 128.

In more detail, after a demodulated and channel decoded stream signal TS 1 or TS 2 is received from the demodulation unit 130 or 135, a stream signal is received from the external input signal input unit 128, or a converted digital signal DV is received from the analog/digital conversion unit 140, the stream signal TS 1 or TS 2 may be demultiplexed, some of the demultiplexed image signals may be extracted, and multiplexing is performed based on a image signal including the extracted image signals, in order to output a new stream signal TSa. For example, the stream signal TSa or TSb may be an MEPG 2 TS.

Additionally, the channel browsing processing unit 170 may output a main stream signal TSb, which corresponds to a main image signal displayed on a main area among image signals displayed on the display unit 170, as it is without additional processing, and also may output a sub stream signal TSa, which corresponds to a sub image signal displayed on a sub area among image signals displayed on the display unit 180, after the above-mentioned channel browsing processing.

According to an embodiment of the present invention, the channel browsing processing unit 170 extracts some images from broadcast signals in a plurality of channels and re-encodes them as a stream type. Therefore, when a channel list is displayed on the display unit 180, at least a portion of a broadcast signal image in a plurality of channels may be displayed in a thumbnail form. Accordingly, a user may intuitively know the contents broadcasted in another channel.

The channel browsing processing unit 170 extracts some images from various external input images inputted through the external signal input unit 128 and re-encodes them as a stream type. Therefore, when an external input list is displayed on the display unit 180, at least a portion of an external input image from a plurality of external input devices may be displayed in a thumbnail form. Accordingly, a user may intuitively know the contents inputted from an external input device.

Moreover, the channel browsing processing unit 170 extracts some images from the broadcast signal images of the channels and the external input images and re-encodes them as a stream type. Therefore, when a channel list and an external input list are displayed on the display unit 180, at least a portion of broadcast signal images in a plurality of channels and external input images from a plurality of external input devices may be displayed in a thumbnail form.

Accordingly, a user may intuitively know the contents inputted from a plurality of channels and an external input device.

The storage unit 175 may store a program for each signal processing and control in the control unit 160, and also may store a signal-processed image signal and sound signal, and data signal.

Additionally, the storage unit 175 may perform a function for temporarily storing image, sound, or data signals inputted from the external signal input unit 128.

Moreover, the storage unit 175 may store a corresponding broadcast channel through a channel memory function, and for this, may include at least one type of storage media such as a flash memory type, a hard disk type, a multimedia card micro type, a card type memory (for example, SD or XD memory), RAM, and ROM (EEPROM, etc.).

Although the storage unit 175 and the control unit 160 are separately provided in the drawings, the present invention is not limited thereto, and thus, the storage unit 175 may be included in the control unit 160.

Moreover, the display device 100 may play files (for example, video files, still image files, music files, and document files) stored in the storage unit 175, and then, may provide them to a user.

The display unit 180 converts an image signal, a data signal, an OSD signal processed in the control unit 160 or an image signal and a data signal received in the external signal input unit 128 into R, G, B signals, respectively, in order to generate a driving signal.

The display unit 180 may be implemented in various forms such as PDP, LCD, OLED, flexible display, and 3D display. Additionally, the display unit 180 may include a touch screen, and thus, may be used as an input device in addition to an output device.

The sound output unit 185 receives a sound-processed signal, for example, a stereo signal, a 3.1 channel signal, or a 5.1 channel signal, from the control unit, and outputs it as sound. The sound output unit 185 may be implemented with various types of speakers.

The remote control device 200 transmits a user input to the interface unit 150. For this, the remote control device 200 may use Bluetooth, Radio Frequency (RF) communication, IR communication, Ultra Wideband (UWB), and ZigBee.

Additionally, the remote control device 200 may receive an image signal, a sound signal, and a data signal from the interface unit 150, and then, may output it.

According to an embodiment of the present invention, the remote control device 200 may be an input means for performing the user input described with reference to FIGS. 1 to 36, for example, the drag and drop operation, and that is, a user may move the pointer 30 displayed on a screen through the remote control device 200.

Moreover, although it is described in FIG. 38 that the display device 100 includes two tuners 120 and 125, the present invention is not limited thereto, and thus, one or at least three tuners may be included.

The display device 100, as a fixed type, may be a digital broadcast receiver for receiving at least one of a digital broadcast of an ATSC type (8-VSB type), a digital broadcast of a DVB-T type (COFDM), and a digital broadcast of an ISDB-T type (BST-OFDM type). Or, the display device 100, as a portable type, may be a digital broadcast receiver for receiving at least one of a digital broadcast of a terrestrial DMB type, a digital broadcast of a satellite DMB type, a digital broadcast of an ATSC-M/H type, a digital broadcast of a DVB-H type (COFDM type), and a digital broadcast of a Media Forward Link Only type. Additionally, the display device 100 may be a digital broadcast receiver for cable, satellite communication, and IPTV.

Figure 39:
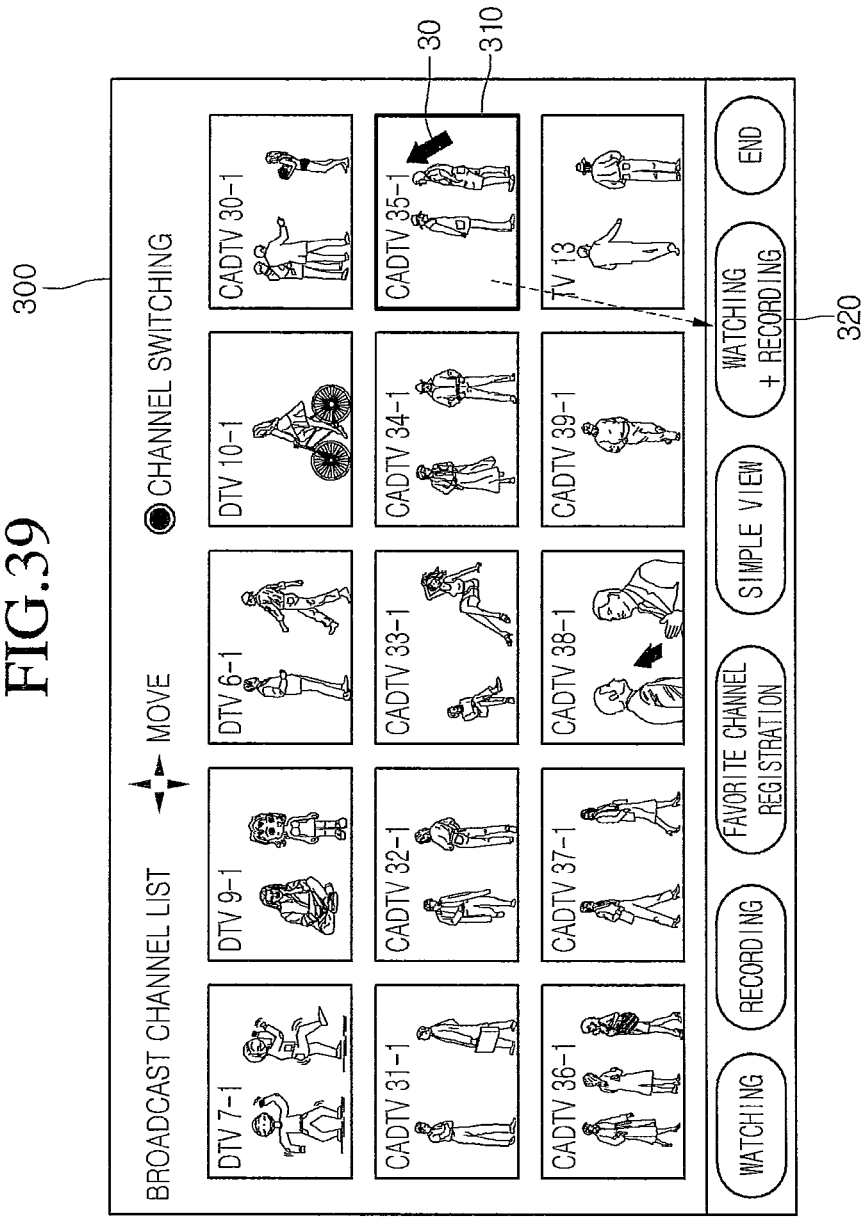
FIG. 39 is a view illustrating a method of controlling a plurality of channels in a channel browser according to an embodiment of the present invention.

FIG. 39 is a view illustrating a configuration of a channel browser displayed on a screen according to an embodiment of the present invention.

Referring to FIG. 39, a channel browser, which includes thumbnail images respectively corresponding to a plurality of broadcast channels that a display device may receive, may be displayed on the screen 300.

Thus, since a channel browser includes thumbnail images that respectively correspond to a plurality of channels, a user may intuitively know the contents broadcasted in a plurality of channels.

Moreover, a channel browser displayed on the display unit 180 may further include a function menu. The function menu may include a "watching" function, a "recording" function, a "favorite channel registration" function, an "easy view" function, and a "watching+recording" function, for a selected channel.

Moreover, a thumbnail image displayed on the channel browser may be a still image or video, and also may be an image of contents currently received in a corresponding channel or an image of pre-stored contents.

Moreover, the thumbnail images may be images processed and outputted by the channel browsing processing unit 170.

While the channel browser is displayed, if one of a plurality of displayed thumbnail images is selected, a broadcast signal image of a channel corresponding to the selected thumbnail image may be displayed on the screen 300.

Additionally, thumbnail images displayed in the channel browser may be aligned according to one of a channel number, a preset favorite channel, a recently watched channel, and a preset delete channel.

As shown in FIG. 39, a pointer 30 may be displayed on a channel browser, and when the pointer 30 moves by a user input means such as a space remote controller, it may move according to a moving direction such as up, down, left and right.

Moreover, although it is illustrated in FIG. 39 that the channel browser is displayed over the entire area of the screen 300, the present invention is not limited thereto. For example, while a specific image is displayed on the screen 30, a channel browser including a plurality of thumbnail images may be displayed in some areas.

Additionally, some of the thumbnail images may be periodically or randomly updated, and such an update operation may be performed by the channel browsing processing unit 170.

According to an embodiment of the present invention, a user moves the pointer 30 displayed on the screen 300 by using an input means, for example, a space remote controller, and selects one of the plurality of thumbnail images included in the channel browser.

Additionally, a user may select a thumbnail image corresponding to a desired channel by using a space remote controller, and then, may drag the selected thumbnail image in a specific direction (indicated with an arrow) in order to move it.

For example, a user may confirm a plurality of thumbnail images displayed on the channel browser in order to recognize the contents of each channel, and then, according thereto, may determine to perform a "watching" function and a "recording" function on a "CADTV 35-1" channel.

In this case, as shown in FIG. 39, a user may drag a thumbnail image 310 corresponding to the "CADTV 35-1" channel, and then, may drop it in a "watching+recording" function area 320.

As the drag and drop operation is inputted into the display device, an image of the "CADTV 35-1" channel may be displayed on the screen 300 and the channel may be recorded on a storage medium simultaneously.

Figure 40:
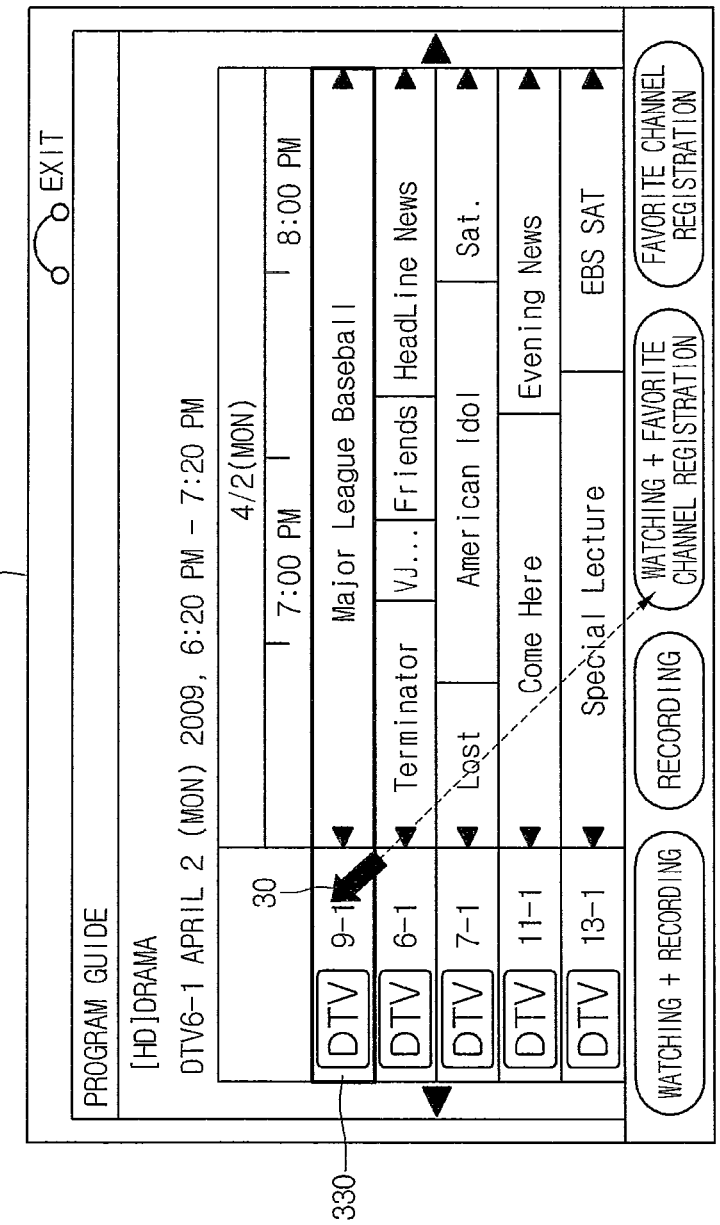
FIG. 40 is a view illustrating a method of controlling a plurality of channels in a program information window according to an embodiment of the present invention.

FIG. 40 is a view illustrating a method of controlling a plurality of channels in a program information window according to an embodiment of the present invention.

Referring to FIG. 40, a program information window, which displays program information on each of a plurality of channels that the display device 100 may receive, may be displayed on the screen 300.

Moreover, the program information on each of the plurality of channels may be obtained using EPG information in a broadcast signal received by the display device 100.

As shown in FIG. 40, a user may move the pointer 30 displayed on the screen 300 by using an input means, for example, a space remote controller, and then, may select one of the plurality of channels in the program information window.

For example, on a program information window, a user may drag an image 330 of a "Major League Baseball" program to be broadcasted in a "DTV 9-1" channel and may drop the image 330 in a "watching+favorite channel registration"

function area 340, so that "watching" and "favorite channel registration" may be performed on the "Major League Baseball" program.

FIG. 41 is a view illustrating a configuration of a channel browser displayed on a screen according to another embodiment of the present invention. The same contents described with reference to FIGS. 1 to 40 will not be described below.

Referring to FIG. 41, a user may confirm a plurality of thumbnail images displayed on the channel browser in order to recognize the contents of each channel, and then, according thereto, may determine to perform a "watching" function and a "recording" function on a "CADTV 35-1" channel.

In this case, as shown in FIG. 41, a user may drag a thumbnail image 310 corresponding to the "CADTV 35-1" channel, and then, may drop it in a "playback" function area 330 through a "watching" function area 320.

As the drag and drop operation is inputted into the display device, an image of the "CADTV 35-1" channel may be displayed on the screen 300 and the channel may be recorded on a storage medium simultaneously.

Moreover, the contents controlling method may be performed by a 3D image display device. That is, a plurality of contents, which are described with reference to FIGS. 1 to 41, for example, images of a plurality of broadcast channels, may be respectively displayed as 3D images on a screen.

The term 3D is used to describe visual expression or display technique for playing a 3D video having the illusion effect of depth. With respect to the image of the left eye and the image of the right eye, the visual cortex of an observer interprets two images as one 3D image.

The 3D display technique may adopt a technique of 3D image processing and expression to a 3D image display available device. Selectively, a 3D image display available device should use a special observation device in order to effectively provide a 3D image to an observer.

Examples of 3D image processing and expression include a stereoscopic image/video capture, a multiview image/video capture using a plurality of cameras, and processing of depth information on a 2D image. Examples of a 3D image display available device include a Liquid Crystal Display (LCD), a digital TV screen, and a computer monitor, which are equipped with hardware and/or software proper for supporting a 3D display technique. Examples of a special observation device may include specialized glasses, a goggle, a head gear, and an eyewear.

In more detail, the 3D image display technique may include an anaglyph 3D image (typically, with passive red-cyan glasses), a polarized 3D image (typically, with passive polarized glasses), Alternate-Frame Sequencing (typically, with active shutter glasses/head gear), and an Autostereoscopic Display using a Lenticular or Barrier screen.

According to an embodiment of the present invention, the 3D image display technique may use an optical device that rotates or operates alternately, for example, a Segmented Polarizer attached to a color filter wheel, and at this point, mutual synchronization is required. Another 3D image display technique may use a Digital Light Processor (DLP), which is based on a Digital Micromirror Device (DMD) using rotatable Micorscopic Mirrors arranged in a rectangular array corresponding to a pixel of an image to be displayed.

Moreover, a new type of standard relating to the rendering and display technique of a 3D image (especially, 3D TV) is developed in current various companies, consortiums, and organizations, and its examples include The Society Of Motion Picture And Television Engineers (SMPTE), Consumer Electronics Association (CEA), 3d@Home consortium, and International Telecommunication Union (ITU). Besides that, other standardization groups such as DVB, BDA, ARIB, ATSC, DVD forum, and IEC are also involved. The Moving Picture Experts Group (MPEG) participates in a multiview image, a stereoscopic image, and 3D image coding of a 2D image including depth information, and currently, the standardization of Multiview Video Coding Extension for MPEG-4 Advanced Video Coding (AVC) is underway. Stereoscopic image coding and stereoscopic distribution formatting relate to color shifting (Anaglyph), Pixel Sub-Sampling (Side-By-Side), Checkerboard, Quincunx, and Enhanced Video Coding (2D+Delta, 2D+Metadata, 2D including depth information).

Furthermore, a typical 2D image display creates only one image. On the contrary, a 3D image display device creates one 3D image by using the left image and right image.

In order to implement a 3D image, a method of alternately displaying the left image and the right image includes a frame by frame method, a side by side method, and a top-down method.

The frame by frame method is to alternately project the left image and the right image on an entire screen. The frame by frame method is also referred to as a frame sequential method, and alternately displays the left screen and the right screen, thereby providing an original maximum resolution. Such characteristics are referred to as a full resolution.

The side by side method divides a screen into the left and right in order to project each of the left image and the right image on a screen. Also, the top-down method divides a screen into the top and bottom in order to project each of the left image and the right image on a screen.

The method of controlling contents according to the present invention can be written as computer programs and can be implemented in general-use digital computers that execute the programs using a computer readable recording medium. Examples of the computer readable recording medium include read-only memory (ROM), random-access memory (RAM), CD-ROMs, magnetic tapes, floppy disks, and optical data storage devices, and further includes carrier waves (such as data transmission through the Internet)

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A method of controlling contents, the method comprising:
   displaying contents images that respectively correspond to a plurality of contents from at least one broadcast channel, and a plurality of functions that are related to the contents from the broadcast channel and are able to be performed on the contents;

receiving input for dragging an image corresponding to first contents among the displayed contents images and dropping the dragged image in a first area, wherein the input is received from a remote control device; and performing at least one function that respectively corresponds to the first area on the first contents.

2. The method of claim 1, wherein the performing of the at least one function further comprises displaying information on a plurality of functions corresponding to the first area.

3. The method of claim 2, further comprising displaying information on the plurality of functions corresponding to the first area.

4. The method of claim 1, further comprising:
selecting a first function and a second function; and
storing the first and second functions in correspondence to the first area.

5. The method of claim 4, wherein the selecting of the first function and the second function comprises dragging an image representing the first function and dropping the dragged image in an area corresponding to the second function.

6. The method of claim 1, wherein the receiving of the input comprises:
selecting a plurality of contents images including the first contents image;
dragging the plurality of the selected contents images; and
dropping the plurality of the selected contents images in the first area.

7. The method of claim 6, wherein the performing of the at least one function comprises performing at least one function corresponding to the first area on the plurality of contents.

8. The method of claim 1, further comprising displaying information on previously-performed functions.

9. The method of claim 8, further comprising:
selecting at least one function among the previously-performed functions; and
performing the selected at least one function.

10. The method of claim 1, further comprising:
selecting a second area; and
displaying performance information on functions corresponding to the second area.

11. The method of claim 1, wherein the performing of the at least one function comprises performing a first function corresponding to the first area and a second function corresponding to a drag path of an image corresponding to the first contents, on the first contents.

12. The method of claim 11, wherein the second function corresponds to a second area on the drag path.

13. The method of claim 11, further comprising, when the first contents image is dragged and passes through a second area corresponding to the second function, displaying at least one sub function that is performed together with the second function.

14. The method of claim 11, further comprising, when the first contents image is selected, displaying at least one sub function available for the first contents.

15. A method of controlling contents, the method comprising:
displaying a plurality of contents images respectively corresponding to a plurality of contents from at least one broadcast channel;
receiving input for dragging an image of a first area and dropping the dragged image in an area where an image corresponding to first contents among the displayed contents images is displayed, wherein the input is received from a remote control device; and
performing at least one function that respectively corresponds to the first area on the first contents.

16. A contents playing device comprising:
a display unit for displaying contents images that respectively correspond to a plurality of contents from at least one broadcast channel and a plurality of functions that are related to the contents from the broadcast channel and are able to be performed on the contents;
an interface unit for receiving input for dragging an image corresponding to first contents among the displayed contents images and dropping the dragged image in a first area, wherein the input is received from a remote control device; and
a control unit for performing at least one function that respectively corresponds to the first area on the first contents.

17. The device of claim 16, wherein the interface unit further receives input for adding or deleting functions corresponding to the first area.

18. The device of claim 16, wherein the display unit displays information on previously-performed functions.

19. The device of claim 16, wherein the control unit performs a first function corresponding to the first area and a second function corresponding to a drag path of an image corresponding to the first contents, on the first contents.

* * * * *